US008561581B2

(12) United States Patent
Taylor

(10) Patent No.: US 8,561,581 B2
(45) Date of Patent: Oct. 22, 2013

(54) TWO-STROKE UNIFLOW TURBO-COMPOUND INTERNAL COMBUSTION ENGINE

(76) Inventor: Jack R. Taylor, Cincinnati, OH (US)

( * ) Notice: Subject to any disclaimer, the term of this patent is extended or adjusted under 35 U.S.C. 154(b) by 0 days.

(21) Appl. No.: 13/291,035

(22) Filed: Nov. 7, 2011

(65) Prior Publication Data

US 2012/0096853 A1    Apr. 26, 2012

Related U.S. Application Data

(63) Continuation-in-part of application No. 12/849,175, filed on Aug. 3, 2010, now Pat. No. 8,051,830.

(60) Provisional application No. 61/231,306, filed on Aug. 4, 2009.

(51) Int. Cl.
  *F02B 75/22*    (2006.01)
  *F02B 31/00*    (2006.01)

(52) U.S. Cl.
  USPC ........ 123/54.1; 123/53.4; 123/55.2; 123/306; 123/559.1; 123/65 A; 123/65 W

(58) Field of Classification Search
  USPC ........ 123/54.1, 55.2, 53.3, 55.7, 73 C, 65 PE, 123/65 BA, 65 V, 65 A, 65 VD, 65 W, 65 WA, 123/262, 290, 306, 559.1, 53.4
  See application file for complete search history.

(56) References Cited

U.S. PATENT DOCUMENTS

| | | |
|---|---|---|
| 1,233,621 A | 7/1917 | Twombly |
| 1,649,554 A | 11/1927 | Sweet |
| 1,734,459 A | 11/1929 | Curtis |
| 1,819,097 A | 8/1931 | Highfield |
| 1,855,851 A | 4/1932 | Fedden |
| 1,972,805 A * | 9/1934 | Vanni .......... 123/65 PD |
| 1,995,579 A | 3/1935 | Ricardo |
| 2,018,848 A | 10/1935 | Gruebler |
| 2,058,350 A | 10/1936 | Petter |
| 2,063,374 A | 12/1936 | Hansen et al. |
| 2,123,065 A | 7/1938 | Sass |
| 2,231,392 A | 2/1941 | McCarthy |

(Continued)

FOREIGN PATENT DOCUMENTS

EP    0409428    1/1991

OTHER PUBLICATIONS

Rotax 912 UL DCDI 81H (2 pages.) Printed Nov. 8, 2010. http://www.rotaxservice.com/rotax_engines/rotax_912ULsp.htm.

(Continued)

*Primary Examiner* — Hai Huynh
(74) *Attorney, Agent, or Firm* — Hasse & Nesbitt LLC; Daniel F. Nesbitt

(57) ABSTRACT

A radial, two-stroke uniflow internal combustion (IC) cylinder and multiple cylinder engine, the cylinder having a cylinder wall and a cylinder head, the cylinder head having an exhaust port, a fuel injector, and a spark means disposed through the cylinder head, a piston reciprocally mounted in the cylinder for movement alternately through compression and power strokes, and an inlet swirl port disposed through the cylinder wall providing fluid communication into the cylinder chamber, and having an annular exhaust air manifold in exhaust gas communication with each exhaust ports, and an exhaust-driven radial in-flow turbine that drives the inlet air compression.

19 Claims, 25 Drawing Sheets

(56) References Cited

U.S. PATENT DOCUMENTS

| | | | |
|---|---|---|---|
| 2,236,950 A | 4/1941 | Ricardo | |
| 2,269,084 A | 1/1942 | McCarthy | |
| 2,318,333 A | 5/1943 | Ricardo | |
| 2,483,288 A | 9/1949 | Malin | |
| 2,552,006 A * | 5/1951 | Gill, Jr. | 123/65 VC |
| 2,638,876 A | 5/1953 | Dunning | |
| 2,691,968 A | 10/1954 | Barber | |
| 2,699,765 A | 1/1955 | Taylor | |
| 2,924,069 A * | 2/1960 | Buchi | 60/609 |
| 2,979,045 A | 4/1961 | Busch | |
| 2,991,616 A | 7/1961 | Miller | |
| 3,003,485 A | 10/1961 | Chard | |
| 3,309,865 A | 3/1967 | Kauffmann, et al. | |
| 3,494,335 A | 2/1970 | Meier | |
| 4,069,794 A * | 1/1978 | Jordan | 123/25 A |
| 4,088,098 A | 5/1978 | Rose et al. | |
| 4,207,843 A | 6/1980 | List et al. | |
| 4,359,027 A | 11/1982 | Scharpf | |
| 4,491,096 A | 1/1985 | Noguchi et al. | |
| 4,574,754 A | 3/1986 | Rhoades, Jr. | |
| 4,625,693 A | 12/1986 | Trihey | |
| 4,671,218 A | 6/1987 | Weiland | |
| 4,709,683 A | 12/1987 | Schatz | |
| 4,739,738 A | 4/1988 | Sander et al. | |
| 4,797,070 A | 1/1989 | Schatz | |
| 4,822,242 A | 4/1989 | Yamazaki | |
| 4,836,153 A | 6/1989 | Velencei | |
| 5,072,699 A | 12/1991 | Pien | |
| 5,080,081 A * | 1/1992 | Kawamura | 123/559.1 |
| 5,083,533 A | 1/1992 | Richeson et al. | |
| 5,115,788 A | 5/1992 | Sasaki et al. | |
| 5,131,354 A | 7/1992 | Richeson | |
| 5,134,976 A | 8/1992 | Towner et al. | |
| 5,150,670 A | 9/1992 | Sadler | |
| 5,435,283 A | 7/1995 | Zehr | |
| 5,477,838 A | 12/1995 | Schlunke et al. | |
| 5,517,954 A | 5/1996 | Melchior | |
| 5,566,650 A | 10/1996 | Kruse | |
| 5,605,125 A | 2/1997 | Yaoita | |
| 5,746,163 A * | 5/1998 | Green | 123/65 VC |
| 5,870,982 A | 2/1999 | Strawz | |
| 5,983,854 A | 11/1999 | Machida et al. | |
| 6,101,989 A * | 8/2000 | Green | 123/65 VC |
| 6,101,990 A | 8/2000 | Green | |
| 6,474,275 B1 | 11/2002 | Drecq | |
| 6,848,416 B1 | 2/2005 | Pien | |
| 7,114,485 B2 | 10/2006 | Pien | |
| 7,240,491 B2 | 7/2007 | Olsson et al. | |
| 7,243,641 B2 | 7/2007 | Zukouski | |
| 7,395,668 B2 | 7/2008 | Gobert et al. | |
| 7,469,664 B2 | 12/2008 | Hofbauer et al. | |
| 7,581,526 B2 | 9/2009 | Lehmann | |
| 7,721,704 B2 | 5/2010 | Lehmann | |
| 8,051,830 B2 * | 11/2011 | Taylor | 123/308 |
| 2009/0064975 A1 | 3/2009 | Hedman | |

OTHER PUBLICATIONS

Rotax 80-HP Rotax 912 Aircraft Engine (2 pages.) Printed Mar. 21, 2011. http://www.zenithair.com/pdf-doc/912ul-80hp.pdf.

Thomson, John C., Exhaust Emissions From a Turbocharged Texaco Combustion Process (TCP) Stratified Charge Engine; EPA-AA-TEB 70-2; Divisional of Motor Vehicle Pollution control National Air Pollution Control Administration Department of Health, Education, and Welfare; Apr. 1970; pp. 1-8 (cover page + 8 page article, 9 total pages).

Hooker, Ralph J.; A Gas-Generator Turbocompound Engine, ORION, vol. 65, 1957, pp. 293-330 (38 pages).

Taylor, Charles Fayette; The Internal-Combustion Engine in Theory and Practice; The M.I.T. Press, vol. II: Combustions, Fuels, Materials, Design (Revised Edition), Chapter 2 Combustion in Spark-Ignition Engines II, Detonation and Preignition and Chapter 3 Combustion in Diesel Engines, First paperback edition, 1977; Revised Edition, 1985, pp. 34-117 (cover+preface+chapter 2-3, 45 total pages).

* cited by examiner

TWO-STROKE UNIFLOW TURBO-COMPOUND INTERNAL COMBUSTION ENGINE

CROSS-REFERENCE TO RELATED APPLICATION

This application is a continuation-in-part of U.S. patent application Ser. No. 12/849,175 (now U.S. Pat. No. 8,051, 830), filed Aug. 3, 2010, which claimed the benefit of U.S. Provisional Application No. 61/231,306, filed on Aug. 4, 2009, the disclosures of which are incorporated herein by reference.

BACKGROUND OF THE INVENTION

A diesel engine (also known as a compression-ignition engine) is an internal combustion engine that uses the heat of compression to initiate ignition to burn the fuel, which is injected into the combustion chamber. This is in contrast to spark-ignition engines such as a petrol or gasoline engine or gas engine (that uses a gaseous fuel as opposed to gasoline), which uses a spark plug to ignite an air-fuel mixture.

The diesel engine has the highest thermal efficiency of any regular internal or external combustion engine due to its very high compression ratio. Low-speed Diesel engines (as used in ships and other applications where overall engine weight is relatively unimportant) often have a thermal efficiency which exceeds 50 percent.

Diesel engines are manufactured in two stroke and four stroke versions. They have been used in submarines and ships, locomotives, trucks, heavy equipment and electric generating plants, and eventually in automobiles, on-road and off-road vehicles.

The diesel internal combustion engine differs from the gasoline powered Otto cycle by using highly compressed hot air to ignite the fuel rather than using a spark plug (compression ignition rather than spark ignition). In the true diesel engine, only air is initially introduced into the combustion chamber. The air is then compressed with a compression ratio typically between 15:1 and 22:1 resulting in 40-bar (4.0 MPa; 580 psi) pressure compared to 8 to 14 bars (0.80 to 1.4 MPa) (about 200 psi) in the gasoline/petrol engine. This high compression heats the air to 550° C. (1,022° F.). At about the top of the compression stroke, fuel is injected directly into the compressed air in the combustion chamber. This may be into a (typically toroidal) void in the top of the piston or a prechamber depending upon the design of the engine. The fuel injector ensures that the fuel is broken down into small droplets, and that the fuel is distributed evenly. The heat of the compressed air vaporizes fuel from the surface of the droplets. The vapor is then ignited by the heat from the compressed air in the combustion chamber, the droplets continue to vaporize from their surfaces and burn, getting smaller, until all the fuel in the droplets has been burnt. The start of vaporization causes a delay, period during ignition and the characteristic diesel "knocking" sound as the vapor reaches ignition temperature and causes an abrupt increase in pressure above the piston. The rapid expansion of combustion gases then drives the piston downward, supplying power to the crankshaft.

As well as the high level of compression allowing combustion to take place without a separate ignition system, a high compression ratio greatly increases the engine's efficiency. Increasing the compression ratio in a spark-ignition engine where fuel and air are mixed before entry to the cylinder is limited by the need to prevent damaging pre-ignition. In a true Diesel engine, premature detonation is not an issue because only air is compressed in a diesel engine, and fuel is not introduced into the cylinder until shortly before top dead centre (TDC), and compression ratios are much higher.

Diesel engines in service today raise the fuel to extreme pressures by mechanical pumps and deliver it to the combustion chamber by pressure-activated injectors without compressed air. With direct injected diesels, injectors spray fuel through 4 to 12 small orifices in its nozzle. The early air injection diesels always had a superior combustion without the sharp increase in pressure during combustion. Air injection-aided spraying can improve dispersion and reduce droplet size.

Diesel engines employ a mechanical or electronic governor that regulates the idling speed and maximum speed of the engine by controlling the rate of fuel delivery. Unlike Otto-cycle engines, incoming air is not throttled and a diesel engine without a governor cannot have a stable idling speed and can easily overspeed, resulting in its destruction. Mechanically-governed fuel injection systems are driven by the engine's gear train. These systems use a combination of springs and weights to control fuel delivery relative to both load and speed. Modern electronically controlled diesel engines control fuel delivery by use of an electronic control module (ECM) or electronic control unit (ECU). The ECM/ECU receives an engine speed signal, as well as other operating parameters such as intake manifold pressure and fuel temperature, from a sensor and controls the amount of fuel and start of injection timing through actuators to maximize power and efficiency and minimize emissions. Controlling the timing of the start of injection (SOI) of fuel into the cylinder can minimize emissions, and improve fuel economy (efficiency), of the engine. The timing is measured in degrees of crank angle of the piston before top dead center. For example, if the ECM/ECU initiates fuel injection when the piston is 10 degrees before TDC, the start of injection, or timing, is said to be 10° BTDC. Optimal timing will depend on the engine design as well as its speed and load.

Advancing the start of injection (injecting before the piston reaches to its SOI-TDC) results in higher in-cylinder pressure and temperature, and higher efficiency, but also results in elevated engine noise and increased oxides of nitrogen ($NO_x$) emissions due to higher combustion temperatures. Delaying start of injection causes incomplete combustion, reduced fuel efficiency and an increase in exhaust smoke, containing a considerable amount of particulate matter and unburned hydrocarbons.

Present day diesel engines use a camshaft—(rotating at half crankshaft speed) lifted, mechanical single plunger with a high pressure fuel pump (driven by the engine crankshaft). For each cylinder, the plunger measures the amount of fuel and determines the timing of each injection. These engines use injectors that are very precise spring-loaded valves that open and close at a specific fuel pressure. For each cylinder a plunger pump is connected to an injector with a high pressure fuel line. Fuel volume for each single combustion is controlled by a slanted groove in the plunger which rotates only a few degrees releasing the pressure, and is controlled by a mechanical governor, consisting of weights rotating at engine speed constrained by springs and a lever. The injectors are held open by the fuel pressure. On high speed engines the plunger pumps are together in one unit. Each fuel line should have the same length to obtain the same pressure delay.

A less complex configuration on high speed engines with fewer than six cylinders is to use an axial-piston distributor pump, consisting of one rotating pump plunger delivering fuel to a valve and line for each cylinder (functionally analogous to points and distributor cap on an gasoline engine). Another method uses a single fuel pump which supplies fuel to each injector constantly at high pressure with a common rail (single fuel line common). Each injector has a solenoid operated by an electronic control unit, resulting in more accurate control of injector opening times that depend on other control conditions, such as engine speed and loading, and providing better engine performance and fuel economy. This design is also mechanically simpler than the combined pump and valve design, making it generally more reliable, and less loud, than its mechanical counterpart.

Modern diesel engines make use direct injection methods. One type is a direct injection injector mounted in the top of the combustion chamber, with electronic control of the injection timing, fuel quantity, EGR and turbo boost, giving more precise control of these parameters which eased refinement and lowered emissions. Unit direct injection injects fuel directly into the cylinder of the engine, combining the injector and the pump into one unit positioned over each cylinder controlled by the camshaft. Each cylinder has its own unit eliminating the high pressure fuel lines, achieving a more consistent injection.

In a two-stroke diesel engine, as the cylinder's piston approaches the bottom dead center, exhaust ports or valves are opened, relieving most of the excess pressure after which a passage between the inlet air box and the cylinder is opened, permitting air flow into the cylinder. The air flow blows the remaining combustion gases from the cylinder—this is the scavenging process. As the piston passes through bottom center and starts upward, the passage is closed and compression commences, culminating in fuel injection and ignition.

Diesels are now turbocharged, and some are both turbo charged and supercharged. Because diesels do not have fuel in the cylinder before combustion is initiated, more than one bar (100 kPa) of air can be loaded in the cylinder without preignition. A turbocharged engine can produce significantly more power than a naturally aspirated engine of the same configuration, as having more air in the cylinders allows more fuel to be burned and thus more power to be produced. A supercharger is powered mechanically by the engine's crankshaft, while a turbocharger is powered by the engine exhaust, not requiring any mechanical power. Turbocharging can improve the fuel economy of diesel engines by recovering waste heat from the exhaust, increasing the excess air factor, and increasing the ratio of engine output to friction losses.

A two-stroke engine does not have a discrete exhaust and intake stroke and thus is incapable of self-aspiration. Therefore all two-stroke engines must be fitted with a blower to charge the cylinders with air and assist in dispersing exhaust gases, a process referred to as scavenging. In some cases, the engine may also be fitted with a turbocharger, whose output is directed into the blower inlet. A few designs employ a hybrid turbocharger for scavenging and charging the cylinders, which device is mechanically driven at cranking and low speeds to act as a blower.

As turbocharged or supercharged engines produce more power for a given engine size as compared to naturally aspirated engines, attention must be paid to the mechanical design of components, lubrication, and cooling to handle the power. Pistons are usually cooled with lubrication oil sprayed on the bottom of the piston. Large engines may use water, sea water, or oil supplied through telescoping pipes attached to the crosshead.

A stratified charge engine is a type of internal-combustion engine, similar in some ways to the Diesel cycle, but running on normal gasoline. The name refers to the layering of fuel/air mixture charge inside the cylinder. In a traditional Otto cycle engine, the fuel and air are mixed outside the cylinder and the mixture is drawn into the cylinder during the intake stroke. The air/fuel ratio is kept very close to stoichiometric, which is defined as the exact amount of air necessary for a complete combustion of the fuel. This mixture is easily ignited and burns smoothly. The problem with this design is that after the combustion process is complete, the resulting exhaust stream contains a considerable amount of free single atoms of oxygen and nitrogen, the result of the heat of combustion splitting the $O_2$ and $N_2$ molecules in the air. These will readily react with each other to create nitrous oxide ($NO_x$), a pollutant. A catalytic converter in the exhaust system re-combines the $NO_x$ back into $O_2$ and $N_2$ in modern vehicles A direct injection diesel engine, on the other hand, injects diesel fuel (which is heavier and resistant to vaporization) directly into the cylinder, the combustion chamber is in the top of the piston. This has the advantage of avoiding premature spontaneous combustion—a problem known as detonation or ping that plagues the Otto cycle engines when the fuel-air mixture pre-detonates with high compression conditions—and allows the diesel to run at much higher compression ratios. This leads to a more fuel-efficient engine, which is commonly found in applications where it is being run for long periods of time, such as in trucks and industrial power plants.

However the Diesel engine has problems as well. The fuel is sprayed right into the highly compressed air and has little time to mix properly. This leads to portions of the charge remaining almost entirely air and other portions almost entirely of unburnt fuel lacking for oxygen. This incomplete combustion leads to the presence of other pollutants such as partially burnt and unburnt fuel—polycyclic aromatic hydrocarbons and the plainly visible exhaust soot. The indirect injection diesel where fuel is injected into a pre-chamber (the best known being Ricardo Consulting Engineers' Ricardo Comet design), where the flame front from the pre-chamber ignition leads to better mixing of the air and fuel, smoother combustion in the cylinder, and a reduction in diesel knock. Indirect injection diesels are a kind of stratified charge engine. These benefits came at the cost of a 10% efficiency reduction compared to direct injection diesels.

The stratified charge design attempts to fix the problems with both fuels. It uses a direct-injection system, like the diesel, with its inherent, ability to be run at efficient high compressions. However, like the Otto, the stratified charge design relies on gasoline's ability to mix quickly and cleanly in order to avoid the poor combustion found in older direct injection diesels. To do this the fuel injectors are aimed to inject the fuel into only one area of the cylinder, often a small "subcylinder" at the top, or periphery, of the main cylinder, to provide. a rich charge in that area that, ignites easily and burns quickly and smoothly. The combustion process proceeds and moves to a very lean area (often only air) where the flamefront cools rapidly and the harmful $NO_x$ has little opportunity to form. The additional oxygen in the lean charge also combines with any CO to form $CO_2$, which is less harmful. This technology has also been applied to the latest electronically controlled direct injection diesels. The injection system on these engines delivers the fuel in multiple injection bursts to ensure better fuel/air mixing and reduced diesel knock. The much cleaner combustion in stratified charge gasoline engines allows for the elimination of the catalytic converter and allows the engine to be run at leaner (lower ratio of fuel to air) mixtures, using less fuel. It has had a similar effect on diesel engine performance. Today's diesels are cleaner and can be twice as powerful as before, while maintaining similar fuel economy.

After years of trying, this layout has proven not to be terribly easy to arrange. The system has been used for many years in slow-running industrial applications, but has generally failed to develop into an automobile engine. Many attempts have been made over the years, notably in Wankel engine applications, but only the Japanese car manufacturers have pressed ahead with piston-engine development.

There remains an important need to provide a low cost, high horsepower internal combustion engine having improved fuel efficiency and low NOx and particulate emissions, that can operate with a variety of fuels.

SUMMARY OF THE INVENTION

The present invention provides an improved cylinder design for a reciprocating two-stroke uniflow internal combustion (IC) engine, and for use in internal combustion engines having multiple cylinders that provide improved swirling and turbulence of inlet air and mixing thereof with fuel.

The present invention also provides a cylinder having a cylinder wall and a cylinder head, the cylinder head having an exhaust port, a fuel injector, and a spark means disposed through the cylinder head, a piston reciprocally mounted in the cylinder for movement alternately through compression and power strokes, and a scroll plenum extending unidirectional around the outside of the cylinder wall and having an inlet, and including at least one swirl port disposed through the cylinder wall providing fluid communication from the scroll plenum into the cylinder chamber, wherein the at least one swirl port has a centerline disposed at an angle tangential with respect to the axial centerline of the cylinder and wherein the at least one swirl port is subject to opening and closing in response to movement of the piston.

The present invention further provides a cylinder having a cylinder wall and a cylinder head, the cylinder head having an exhaust port, fuel injector, and a spark means disposed through the cylinder head, a piston reciprocally mounted in the cylinder for movement alternately through compression and power strokes, and a single inlet air swirl port through the cylinder wall disposed at an angle tangential with respect to the axial centerline of the cylinder, and wherein the single inlet air swirl port in the cylinder wall opens and closes in response to reciprocal movement of the piston.

An aspect of the invention is to provide uniform, turbulent, upward inlet air swirling through the cylinder, which engages a stream of combustible fuel to result in rapid, well defined, stratified charge combustion and very short combustion delay times. The stream of fuel can be a dispersion, spray or aerosol of liquid fuel droplets, or a stream of vaporous fuel.

Another aspect of the present invention is a two-stroke uniflow internal combustion (IC) engine including a high pressure turbocharger that includes a high pressure inlet air compressor, and an exhaust gas turbine that powers the air compressor.

Another aspect of the present invention is a two-stroke uniflow internal combustion engine that uses a low pressure ratio inlet air compressor that draws in ambient air and discharges the compresses into the air intake manifold The low pressure ratio inlet air compressor includes a positive displacement compressor that is driven by the engine powered shaft, to provide a mass quantity of inlet air that is proportional to the engine revolution speed.

Another aspect of the present invention is a reduced pressure power turbine that is driven by the reduced pressure exhaust gas, and mechanically drives the engine crankshaft.

Another aspect of the present invention is a two-stroke uniflow internal combustion (IC) engine that is air cooled.

Another aspect of the present invention is the improved cylinder design for the reciprocating two-stroke uniflow internal combustion (IC) engine using lean burning, direct fuel injection with high inlet air swirl and mixing with the fuel, and a spark ignition means. The lean burning reduces the flame temperature and combustion heat losses and NOx emissions.

Another aspect of the present invention is a radial internal combustion engine that includes a plurality of radially-arranged uniflow engine cylinders, including an inlet air manifold that receives and directs compressed ambient air to the inlet airflow swirl ports associated with the uniflow cylinders, and an exhaust air manifold that receives the exhaust gases from the uniflow cylinders and discharges the exhaust gases to a radial inflow turbine. The exhaust gas manifold can be an annular exhaust gas manifold that receives the exhaust gases from the cylinders through tangential inlets. The inlet air manifold can be an annular inlet air manifold that discharges the compressed manifold air through tangential outlets into the inlet swirl port of each cylinder to minimize pressure loss and maintain inlet air velocity into the cylinder chamber.

More particularly, an aspect of the present invention includes a radially-arranged reciprocating two-stroke, uniflow, internal combustion (IC) engine including a plurality of cylinders arranged radially around a common engine axis, each cylinder including: a cylinder wall and a cylinder head having an exhaust port, an exhaust valve disposed in the exhaust port, a fuel injector and a spark means disposed through the cylinder head, a piston mounted in the cylinder for reciprocal movement between a top dead center (TDC) position and a bottom dead center (BDC) position, and through a compression stroke and a power stroke, at least one swirl inlet port passing through the cylinder wall at the bottom of the cylinder, the inlet port oriented tangential to an axial centerline of the cylinder, wherein the at least one swirl port is covered and uncovered in response to the reciprocal movement of the piston; and further including an annular exhaust air manifold in exhaust gas communication with each exhaust port. An annular inlet air manifold in inlet air communication with each at, least one swirl inlet ports can also be provided.

Another aspect of the present invention is the use of thermal barrier treatments on the inside of the cylinders to further reduce combustion heat loss.

Another aspect of the invention is the use of ceramic matrix composite (CMC) materials for making the combustion-exposed components of the IC engine, to reduce thermal losses.

Another aspect of the present invention is the use of a wide variety of fuels, including gasoline, diesel, alcohol, kerosene, jet-A and biodiesel with the invention, separately, intermittently, or together, with only minor adjustments in to the operating parameters.

The engine of the present invention can be used is a wide variety of applications including aircraft, automobiles, marine vessels, locomotives, heavy construction equipment, and military vehicles.

In another aspect of the invention, the scroll plenum and the plurality of swirl ports extend substantially around the entire circumference of the cylinder wall. The plurality of swirl ports are defined by a plurality of spaced-apart, aerodynamically-shaped swirl vanes, each of the plurality of swirl vanes disposed at an angle tangential with respect to the axial centerline of the cylinder. The number of swirl vanes disposed around the circumference of the cylinder wall is about 10 to about 100.

Another aspect of the invention is the configuration of the plurality of swirl ports to provide the same mass rate of air at the same linear velocity therethrough.

In another aspect of the invention, the lateral cross section of the scroll plenum reduces in area as it extends around the circumference of the cylinder wall, thereby maintaining the velocity of the air flowing through the air plenum and succeeding swirl ports progressing around the circumference of the cylinder wall. In another aspect of the invention, the cross sectional shape of a swirl port includes circular, oval, elliptical and polygonal, with streamlined flow passages to provide high flow coefficients and precisely directed flow. In another aspect of the invention, the head, of the piston includes a plurality of auxiliary vanes disposed on the crown and oriented in the radial direction from the center of the piston crown, transverse to the direction of the swirl vanes, to increase the turbulence of the swirling scavenging air upward within the cylinder chamber.

Another aspect of the present invention is a method for operating a reciprocating two-stroke uniflow multiple cylinder internal combustion (IC) engine. The IC engine includes a high pressure supercharger inlet air system and a plurality of cylinders having a cylinder wall and a cylinder head, the cylinder head having an exhaust port, a fuel injector, and a spark means disposed through the cylinder head, a piston reciprocally mounted in the cylinder for movement alternately through compression and power strokes, and an air inlet including one or more swirl ports disposed through the cylinder wall and entering the cylinder chamber tangentially with respect to the axial centerline of the cylinder, and wherein the one or more swirl ports are opened and closed in response to movement of said piston. The method comprises repeating a cylinder cycle, the cycle comprising the steps of a) passing high pressure inlet air through uncovered one or more swirl ports and into the cylinder with the piston proximate the bottom of its reciprocal stroke within the cylinder, and swirling the inlet air in tangential turbulent unidirectional flow within the cylinder, b) maintaining the exhaust port in an open position while the inlet air ports are uncovered to provide scavenging of the cylinder by the inlet air, c) advancing the piston upward to cover the inlet ports, d) closing the exhaust port, e) compressing the inlet air between the piston and the cylinder head, f) dispersing a fuel near the end of the compression stroke at a lean burning fuel to air ratio in the range of, about 0.04 to about 0.9, the fuel being dispersed in the same tangential direction as the flow of the turbulent, swirling air, to obtain a stratified charge and intimate air-fuel mixing, g) igniting and combusting the stratified charge of the air-fuel mixture to initiate the power stroke, h) opening the exhaust port near the end of the power stroke to exhaust pressurized combustion gases, and i) uncovering the one or more inlet ports as the piston approaches the bottom of its power stroke. Further, the inlet air compressing proceeds to a compression ratio of about 8:1 to about 12:1. The lean burning fuel to air ratio is in the range of about 0.2 to about 0.8, for example about 0.6, but can be operated at limited periods of time at higher ratios when emergency power is demanded. Further, the air inlet and one or more swirl ports can include a scroll plenum extending unidirectional around the outside of the cylinder wall and having an inlet and one or more swirl ports disposed through the cylinder wall and enter the cylinder chamber tangentially with respect to the axial centerline of the cylinder.

The present invention further provides a method for operating a reciprocating two-stroke uniflow multiple cylinder internal combustion (IC) engine, wherein a low pressure positive displacement inlet air compressor that provides a compression ratio of up to 4:1 (for example, about 3:1), and that is driven by the crankshaft of the IC engine. The method comprises repeating a cylinder cycle, the cycle comprising the steps of: a) passing low pressure inlet air through the uncovered one or more swirl, ports and into the cylinder with the piston proximate the bottom of its reciprocal stroke within the cylinder, and swirling the inlet air in tangential turbulent unidirectional flow within the cylinder, preferably wherein the mass quantity of inlet air is proportional to the engine revolution speed, b) maintaining the exhaust port in an open position while the inlet air ports are uncovered to provide scavenging of the cylinder by the inlet air, c) advancing the piston upward to cover the inlet ports, d) closing, the exhaust port, compressing the inlet air between the piston and the cylinder head, preferably to a compression ratio of about 8:1 to about 12:1, f) dispersing a fuel near the end of the compression stroke at a lean burning fuel to air ratio in the range of about 0.2 to about 0.8, the fuel being dispersed in the same tangential direction as the flow of the turbulent, swirling air, to obtain a stratified charge and intimate air-fuel mixing, g) igniting and combusting the stratified charge of the air-fuel mixture to initiate the power stroke, h) opening the exhaust port near the end of the power stroke to exhaust pressurized combustion gases, and i) uncovering the inlet ports as the piston approaches the bottom of its power stroke.

The present invention further provides a method for operating a radial internal combustion (IC) engine that includes a multiple, radially-arranged reciprocating two-stroke uniflow cylinders. The IC engine includes a high pressure supercharger inlet air system that includes a high pressure compressor, and each cylinder includes a cylinder wall and a cylinder head, the cylinder head having an exhaust port, a fuel injector and a spark means disposed through the cylinder head, a piston reciprocally mounted in the cylinder for movement alternately through compression and power strokes, and an air inlet including one or more swirl ports disposed through the cylinder wall and entering the cylinder chamber tangentially with respect to the axial centerline of the cylinder, and wherein the one or more swirl ports are opened and closed in response to movement of said piston. The method comprises repeating a cylinder cycle, the cycle comprising the steps of: a) compressing ambient air and passing the pressurized inlet air into an inlet air manifold, preferably in a circumferential direction into an annular inlet air manifold, b) directing a portion of the pressurized inlet air out of the annular, inlet air manifold, through an uncovered swirl port, and into the cylinder with the piston proximate the bottom of its reciprocal stroke within the cylinder, and swirling the inlet air in tangential, turbulent, unidirectional flow within the cylinder, c) maintaining the exhaust port in an open position while the inlet air ports are uncovered to provide scavenging of the cylinder by the inlet air, d) advancing the piston upward to cover the inlet ports, e) closing the exhaust port, f) compressing the inlet air between the piston and the cylinder head, g) dispersing a fuel near the end of the compression stroke at a lean burning fuel to air ratio, preferably in the range of about 0.2 to about 0.8, the fuel being dispersed in the same tangential direction as the flow of the turbulent, swirling air, to obtain a stratified charge and intimate air-fuel mixing, h) igniting and combusting the stratified charge of the air-fuel mixture to initiate the power stroke, i) opening the exhaust port near the end of the power stroke to exhaust pressurized combustion gases, and j) uncovering the inlet ports as the piston approaches the bottom of its power stroke. The cycle further comprises the steps of passing the pressurized combustion gases in a circumferential direction into an annular exhaust manifold.

The method of the invention can further include a step of providing a high pressure inflow turbine, passing the pressurized combustion gases through the high pressure inflow turbine to extract power from the pressurized combustion gases, and powering the high pressure compressor with the extracted power. The method of the invention can further include a step of driving a power turbine with low pressure exhaust gases from the high pressure inflow turbine, and powering a crankshaft of the IC engine with the power turbine. The method of the invention can further provide dispersing the fuel at a lean burning fuel to air ratio of about 0.04 to 0.8, more typically 0.2 to 0.8, for example, about 0.6. The method of the invention can further provide that the step of advancing the piston upward to cover the inlet ports can occur at the same time or after the step of closing the exhaust, port. The method of the invention can further provide that the high pressure supercharger inlet air system generates high pressure inlet air at a pressure (ratio) of 5-6 times the ambient air pressure. The method of the invention can further provide that the low pressure supercharger inlet air system generates high pressure inlet air at a pressure (ratio) of 1.25-3 times the ambient air pressure.

DETAILED DESCRIPTION OF THE INVENTION

As used herein, a spark means includes a means for igniting a fuel-air mixture in a cylinder for combustion, and can include a spark plug, a flame, a heated tube, a laser, and a magneto.

An Opposed Horizontal Cylinder Engine

Figure 1:
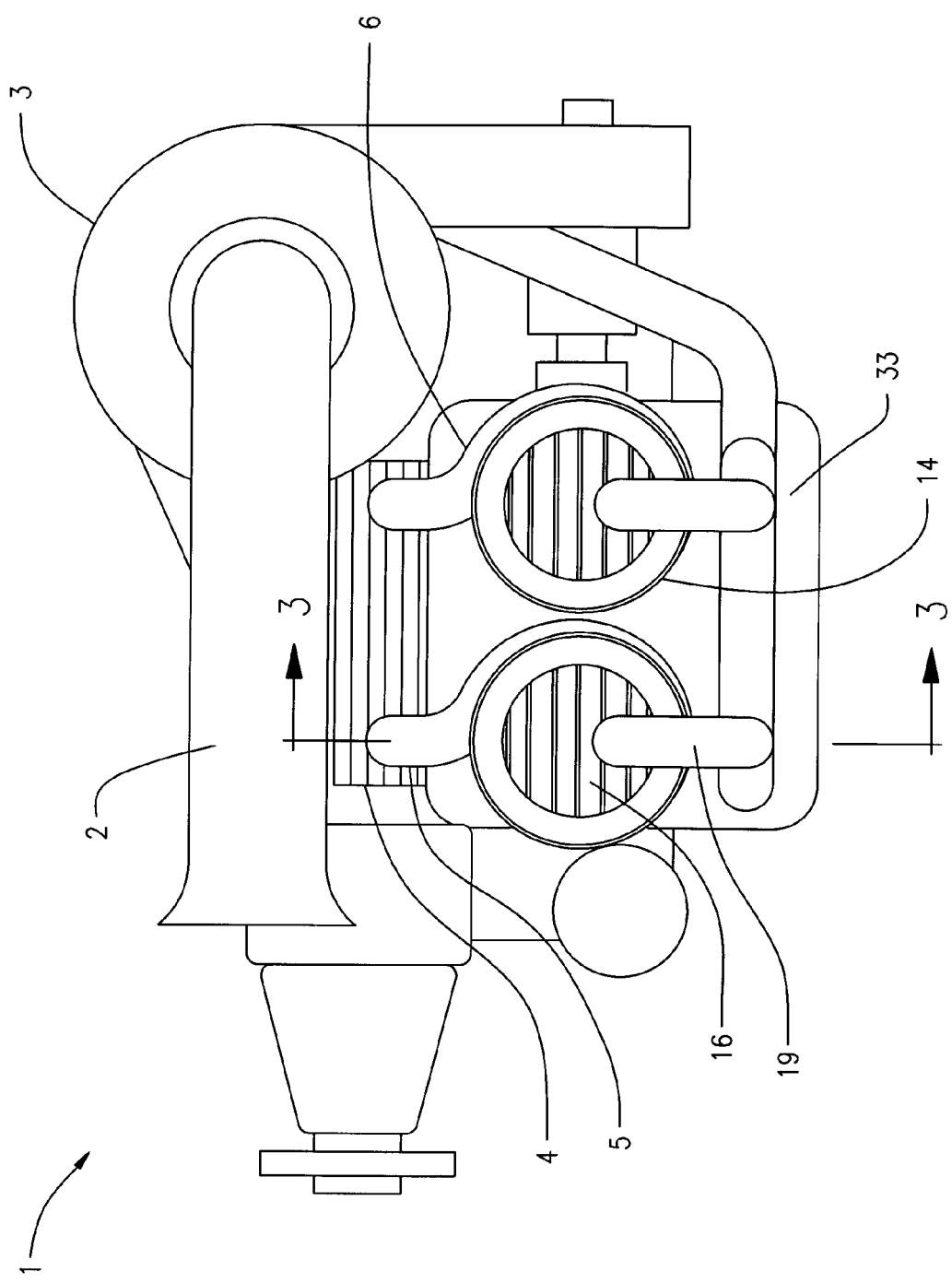
FIG. 1 shows a side elevation view of a turbo-compound, two-stroke uniflow internal combustion (IC) engine of the present invention.
Figure 2:
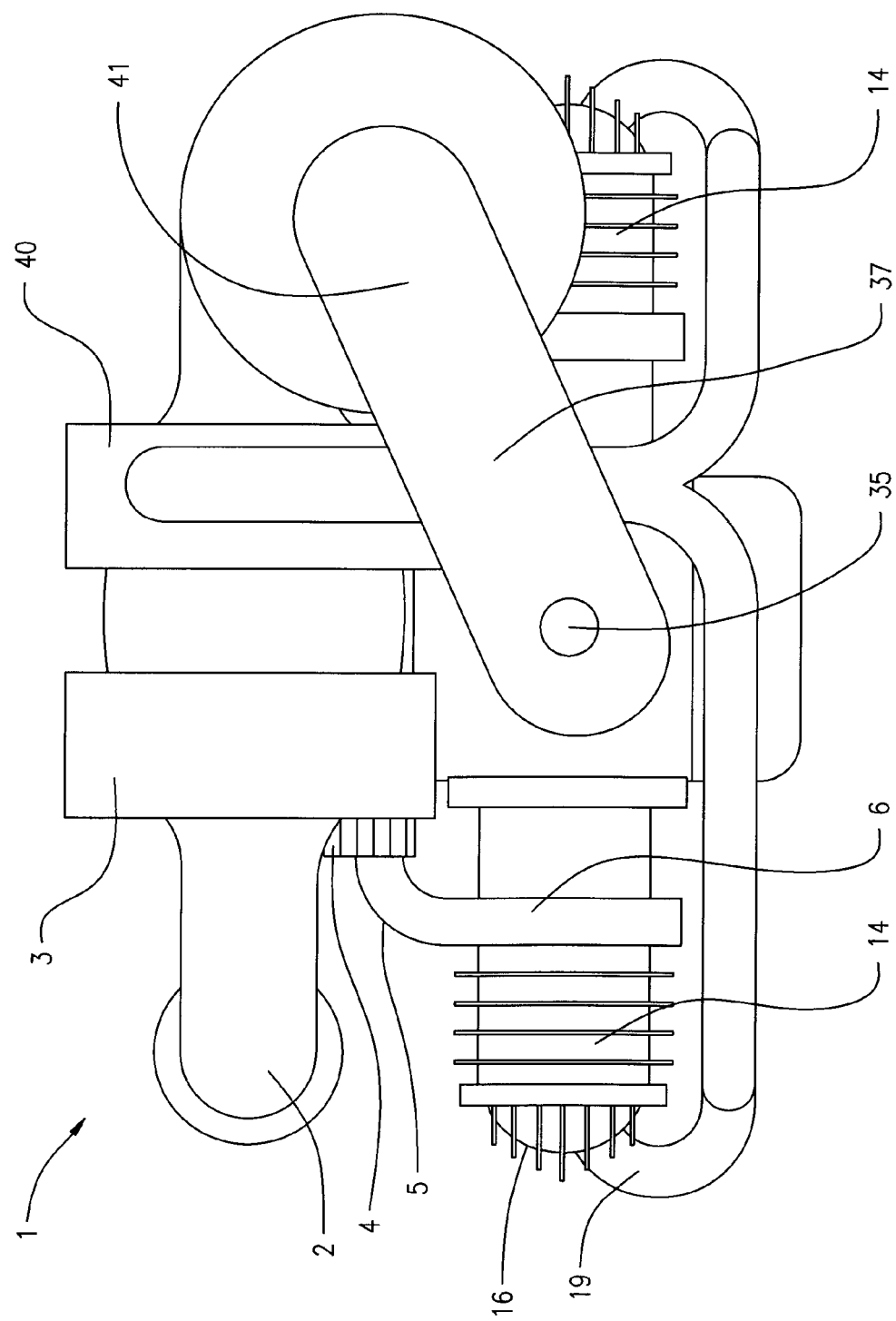
FIG. 2 shows a rear elevation view of the IC engine.
Figure 3:
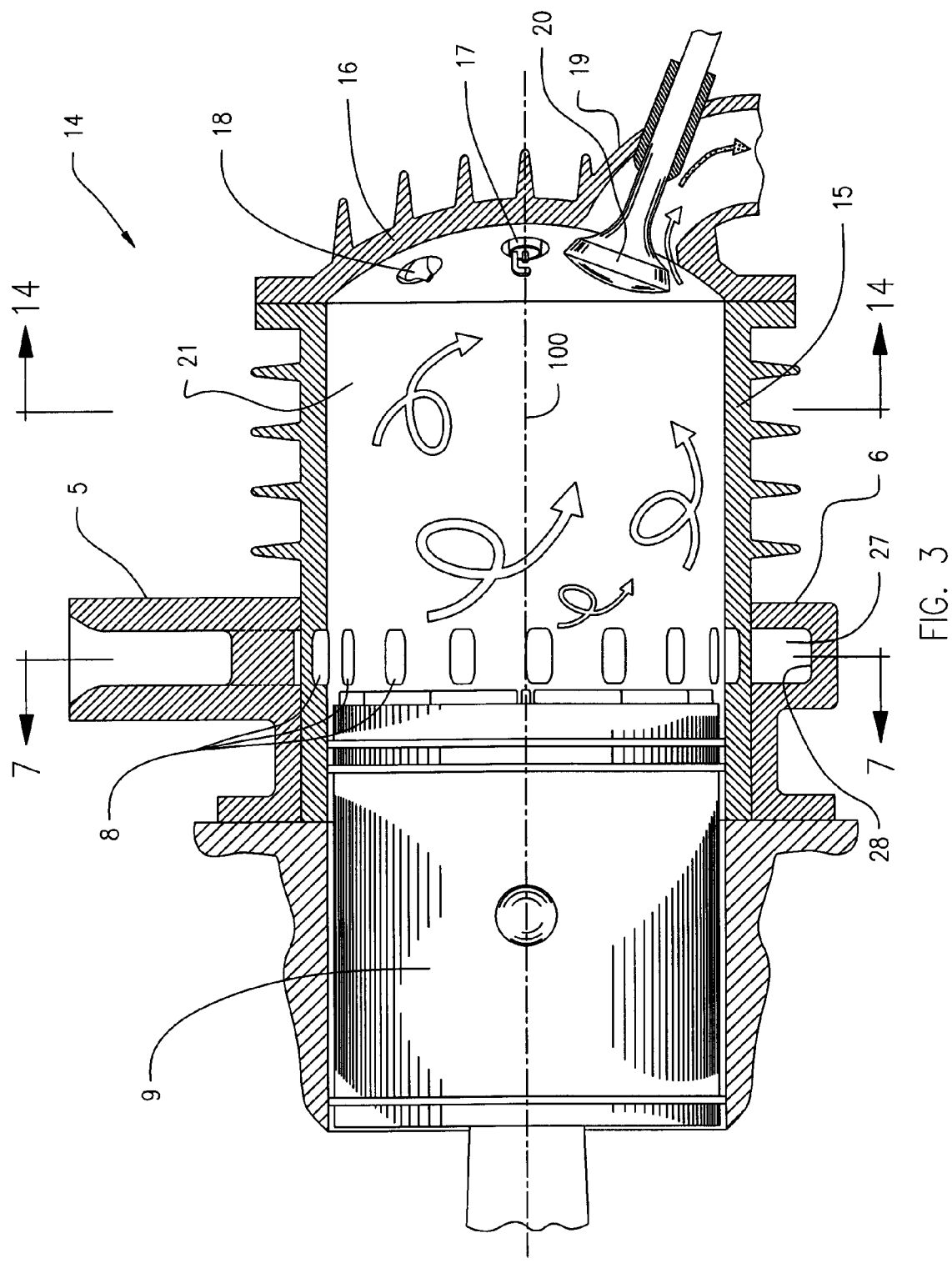
FIG. 3 shows a vertical sectional view through a cylinder of the present invention in an air intake and scavenging condition taken through line 3-3 of FIG. 1.

An embodiment of the two-stroke uniflow internal combustion (IC) engine of the present invention, shown in FIGS. 1-3 illustrates a flat, four cylinder, air cooled engine 1 with a compact two-stroke cycle configuration. The engine of the present invention is of a much smaller size and is much lighter in weight than a comparably-powered engine. Each cylinder 14 of the illustrated engine includes an inlet air scroll plenum 6 that communicates inlet air to cylinder chamber 21 (shown in FIG. 3). A supercharger 3 draws ambient inlet air through an air intake pipe 2 and discharges compressed inlet air to an inlet air intercooling manifold 4, which distributes the cooled (densified), compressed inlet air to each of the four scroll plenums 6 through air inlet ducts 5. The supercharger can be powered mechanically by a belt, gear, shaft, or chain connected to the engine's crankshaft. It can also be powered by a radial inflow gas turbine that is powered by pressurized combustion (exhaust) gases from the exhaust port of the cylinder. The supercharger 3 as illustrated is shaft-powered by an exhaust gas-driven inflow turbine 40, and generates high pressure ratio air compression. This system is also known as a turbocharger. Exhaust gases exit the cylinders 14 through cylinder heads 16 via exhaust outlet ducts 19. A crankcase houses the crankshaft 35 and includes a depending oil pan 33.

An example of an inlet air supercharger for pressurizing ambient air is a Vortech supercharger, available from Vortech Engineering. Additional examples are described in U.S. Pat. Nos. 4,797,070, 4,709,683, 5,115,788, 4,822,242, and 7,240,491, the disclosures of which are incorporated by reference in their entirety. The system can be provided with a mechanism for diverting the high-pressure compressed inlet air from the supercharger if the supply of pressurized air is more than the inlet demand of the cylinders, or if the operating conditions exceed the surge line of a PV curve of the supercharger.

Figure 4:
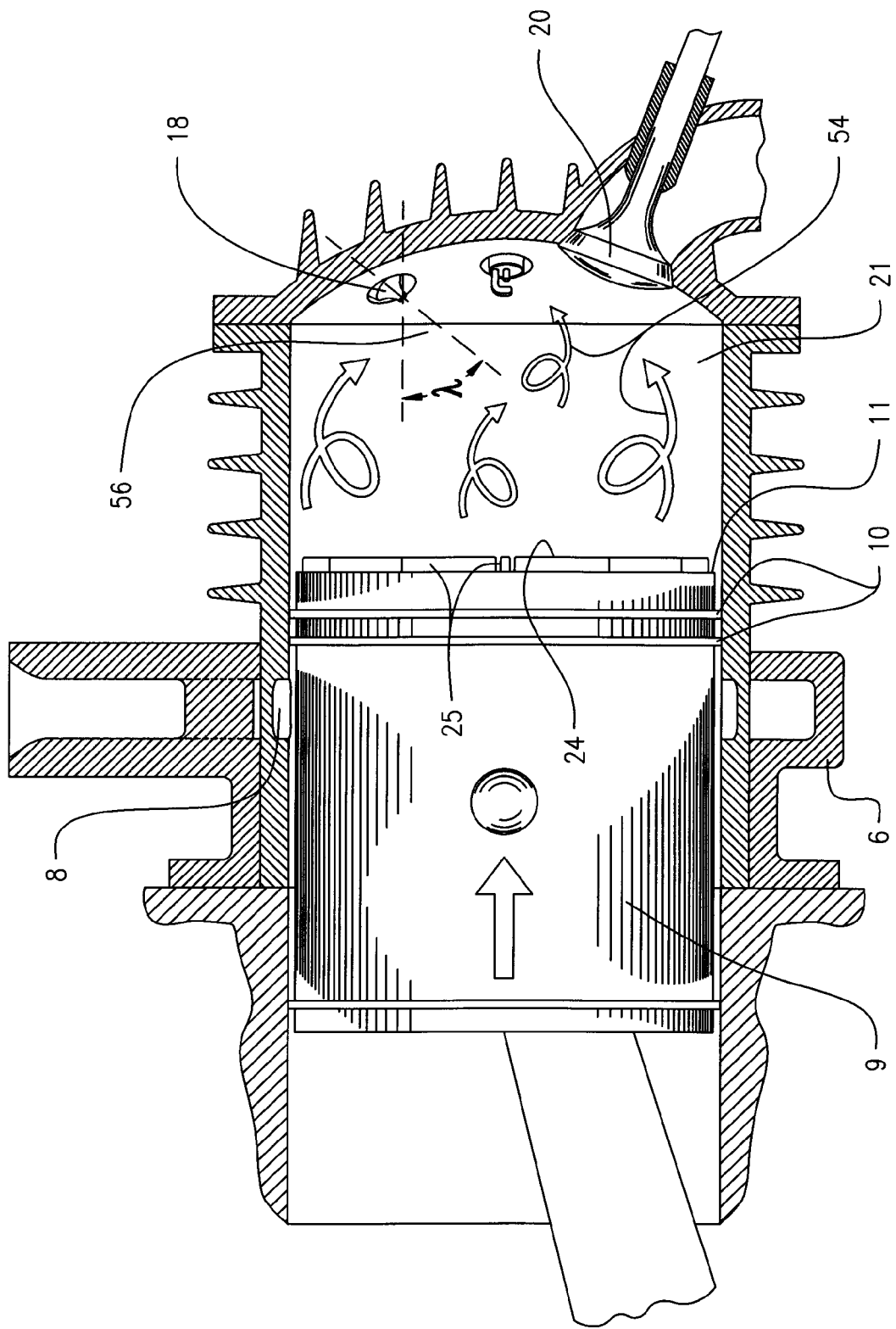
FIG. 4 shows a vertical sectional view through the cylinder of the present invention in a compression and fuel injection condition.
Figure 5:
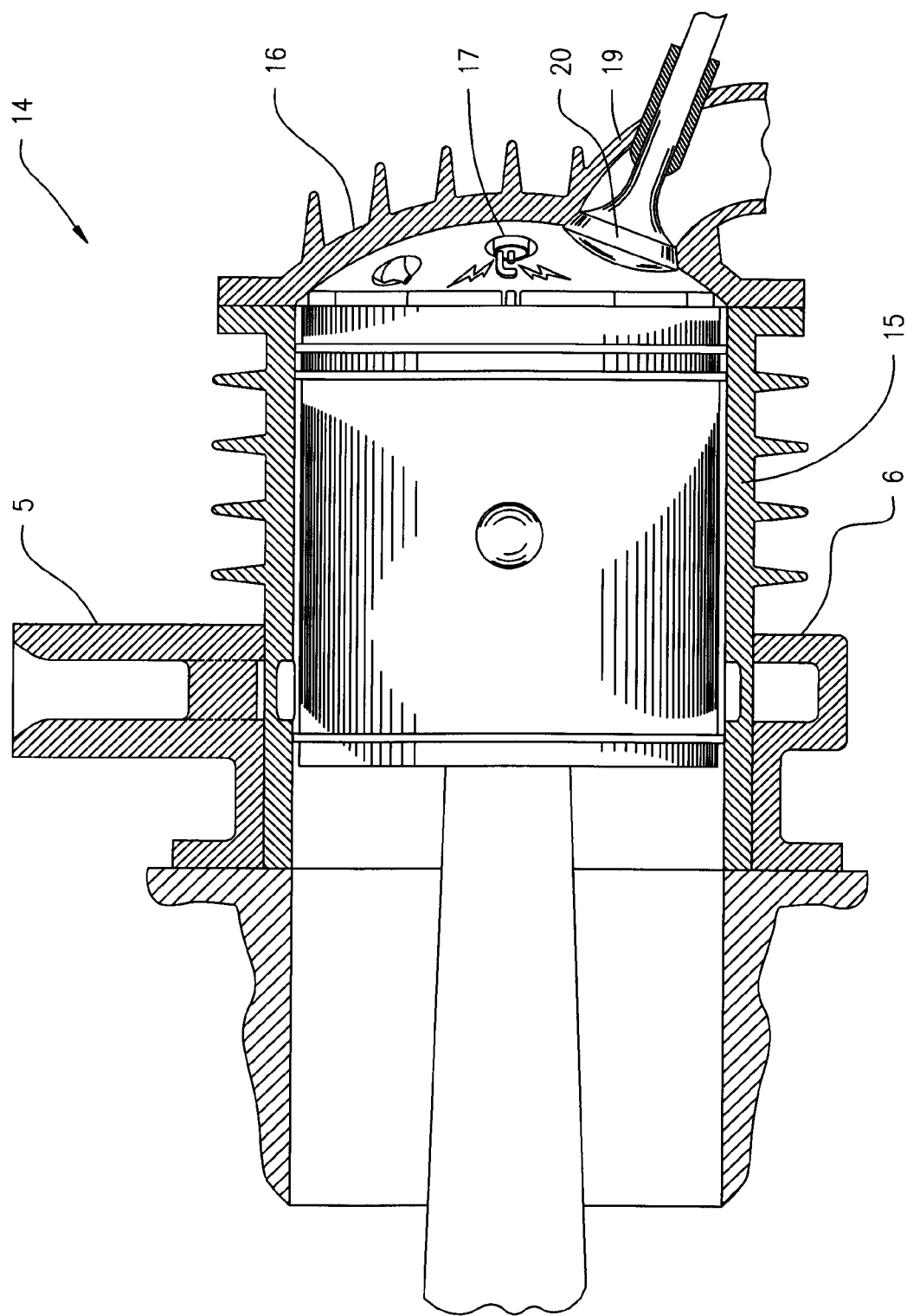
FIG. 5 shows a vertical sectional view through the cylinder of the present invention in a combustion condition.
Figure 6:
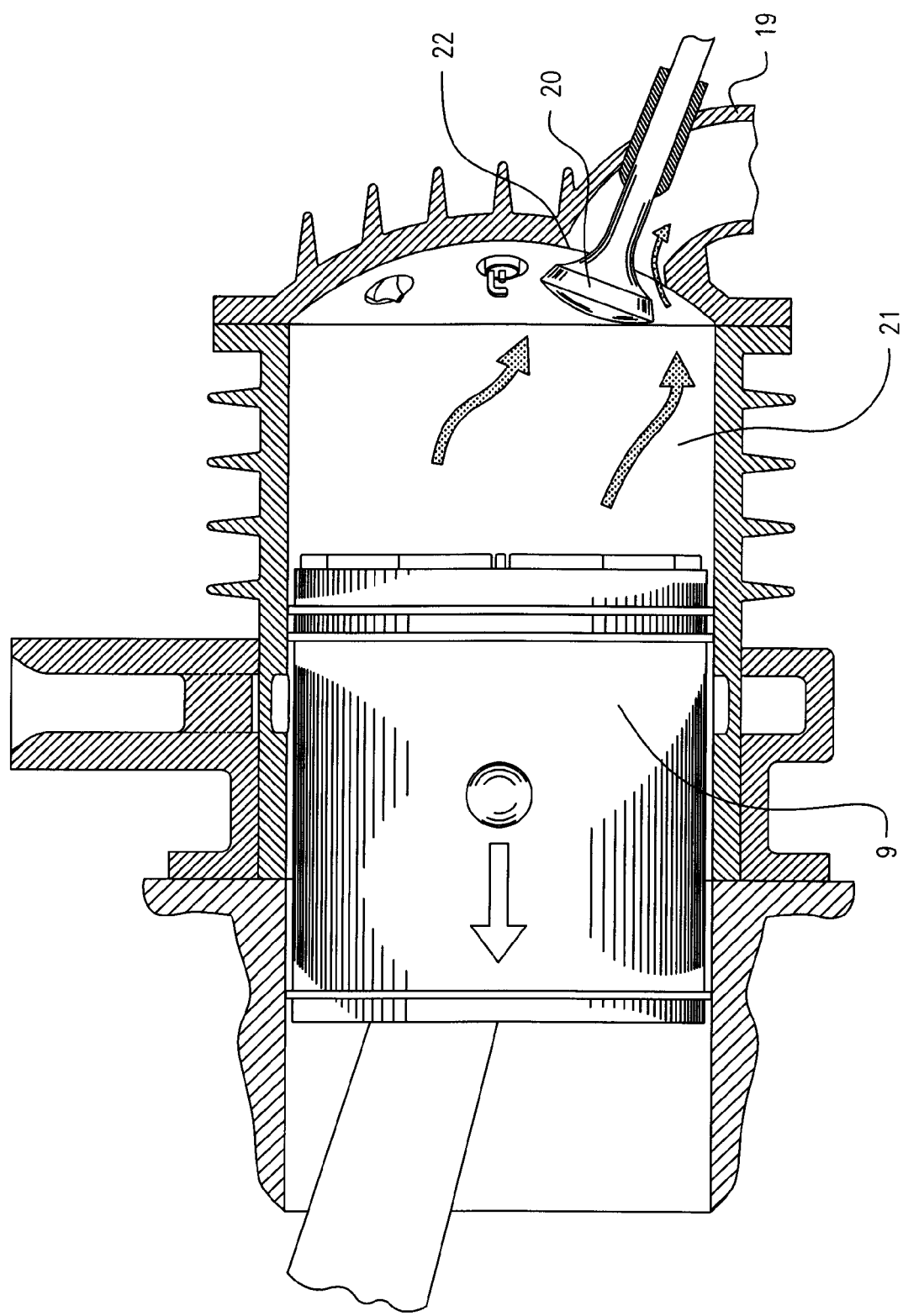
FIG. 6 shows a vertical sectional view through the cylinder of the present invention in a combustion exhaust condition.

FIG. 3 shows a vertical sectional view through one of the cylinders 14 of the engine 1. The cylinder 14 includes a cylindrical wall 15 that defines a variable-volume cylinder chamber 21 between a piston 9 and a cylinder head 16, and has exterior surface cooling fins. Disposed in the cylinder head 16 are a high energy sparkplug 17 as a spark means for igniting a fuel-air mixture, and a fuel injector 18. An example of a fuel injector includes a device described in one of U.S. Pat. No. 5,392,745 and U.S. Pat. No. 6,349,706, the disclosures of which are incorporated by reference herein in their entirety. A poppet-type exhaust valve 20 operates axially between an open position as shown in FIG. 3, and a closed position as shown in FIG. 4, to provide fluid communication between the cylinder chamber 21 and the exhaust outlet duct 19. FIGS. 4-6 show vertical sectional views through the cylinder at other operating phases, as discussed herein after.

The piston 9 of diameter D reciprocates within the cylinder 14 through a stroke length L from the bottom of its stroke to the top of its stroke, to define the total displacement of the cylinder chamber. The piston 9 also has compression stroke C extending from the position where the inlet port is first closed (not shown), to the top of its stroke. In the illustrated embodiment, the ratio of D:L is usually more than 1:1 (a long-stroke displacement), and the ratio D:C is about 1 or more ("over-square"), which reduces linear piston speed and wear.

An aspect of the invention includes the use Ceramic Matrix Composites (CMC) to construct the cylinder including the cylinder walls and the cylinder head, the exhaust valves, and the piston. CMC is a matrix made of a ceramic material embedded between a fibrous material. Typical fibrous materials include carbon, silicon carbide, aluminium oxide and mullite. Aluminium oxide, zirconium oxide and silicon carbide are chiefly used as matrix components. Examples of CMC materials and their use in making components of IC engines are described in U.S. Pat. Nos. 5,888,641 and 5,947,094, the disclosures of which are incorporated by references in their entireties.

Figure 14:
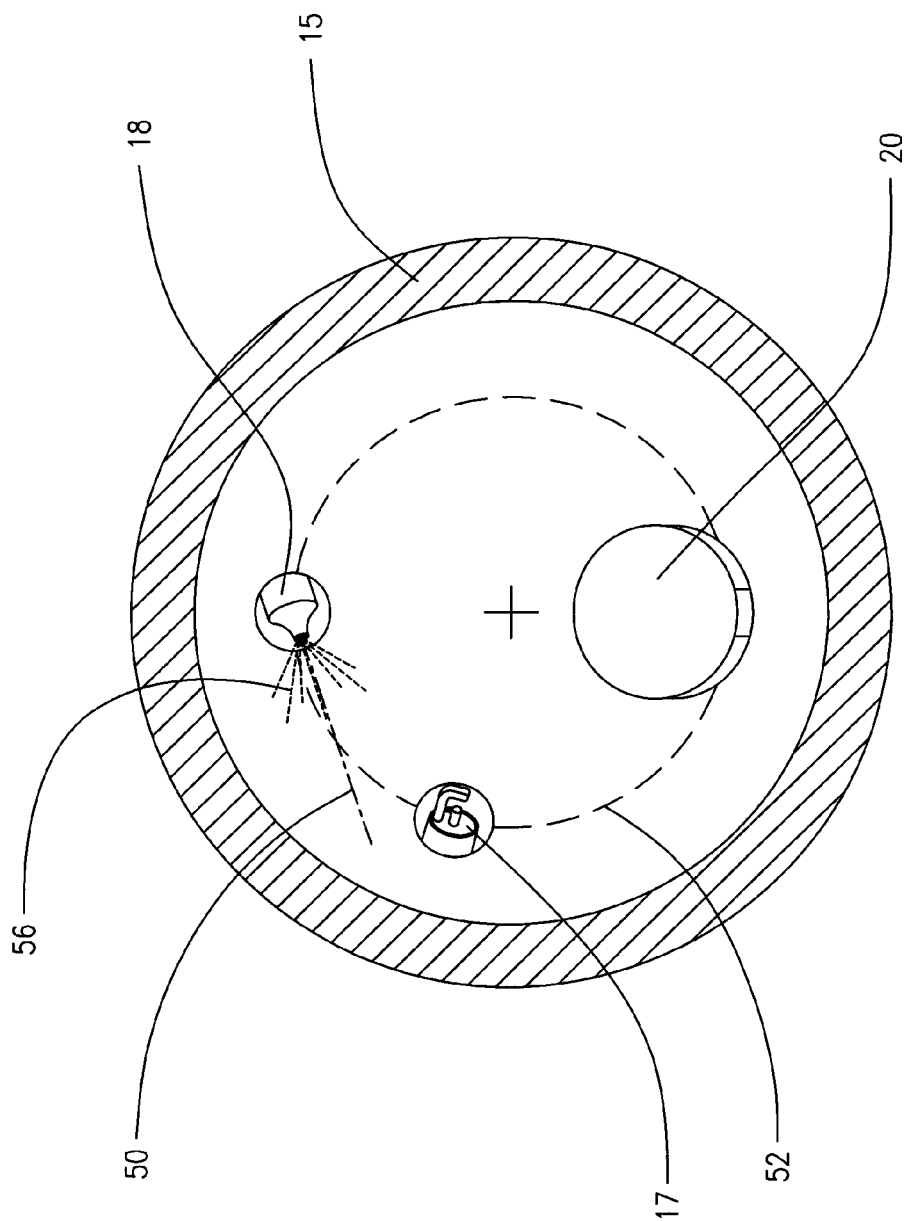
FIG. 14 shows a horizontal sectional view up through the cylinder taken through line 14-14 of FIG. 11.

In an aspect of this invention illustrated in FIGS. 4 and 14, the fuel injector 18 injects the fuel directly into the cylinder along a vector path 50 into a spray pattern 56, at an angle lambda (λ) from vertical (oriented parallel to the centerline 100), and downstream with and along the tangential pathway 52 as the highly turbulent, swirling airflow 54, providing a stratified fuel charge, and lean burning down to very low fuel-air ratios. A stratified charge means that the fuel spray has a spray pattern that is fuel rich in the center of the spray stream where the spark igniter can ignite both rich fuel-air ratios and very lean fuel-air ratios. A spark igniter 17 is positioned directly downstream of the injector (counterclockwise along pathway 52 in FIG. 14) and in the path of the injected fuel 56. The spark igniter 17 ignites the stratified fuel at or after the injected fuel front arrives, resulting in a short combustion delay time of the rapidly mixing stratified fuel charge. The combustion delay time is the time interval between the ignition of the fuel and the completion of the temperature rise due to complete combustion of the quantity of fuel. The ignition occurs at a high (rich) concentration of fuel in the swirling air, despite an overall low (lean) fuel:air ratio. This fuel charging, air mixing and ignition enables the use of various kinds of fuel with different fuel volatilities, and permits use of high compression ratios and very lean fuel-air mixtures (low fuel flow) with no detonation or preignition problems. The engine power output is controlled by the fuel flow, which eliminates intake manifold pressure losses caused by airflow control valves, and results in a large improvement in engine efficiency at low power conditions. Also, at low power conditions, the reduced fuel flow, with lower combustion temperatures, results in significant reductions in cylinder heat losses, which improves the engine efficiency.

Figure 7:
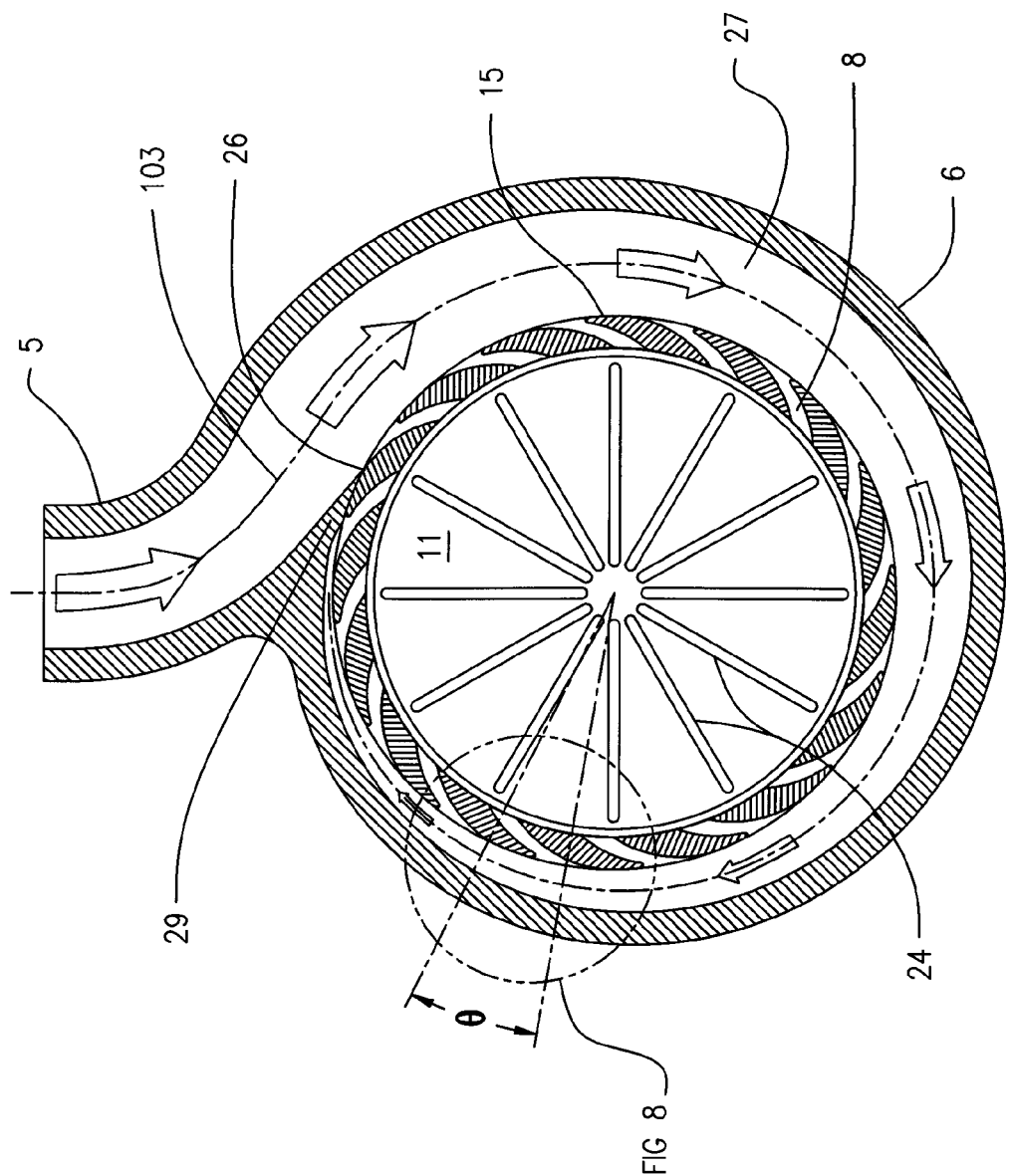
FIG. 7 shows a horizontal sectional view down through the cylinder taken through line 7-7 of FIG. 3.
Figure 8:
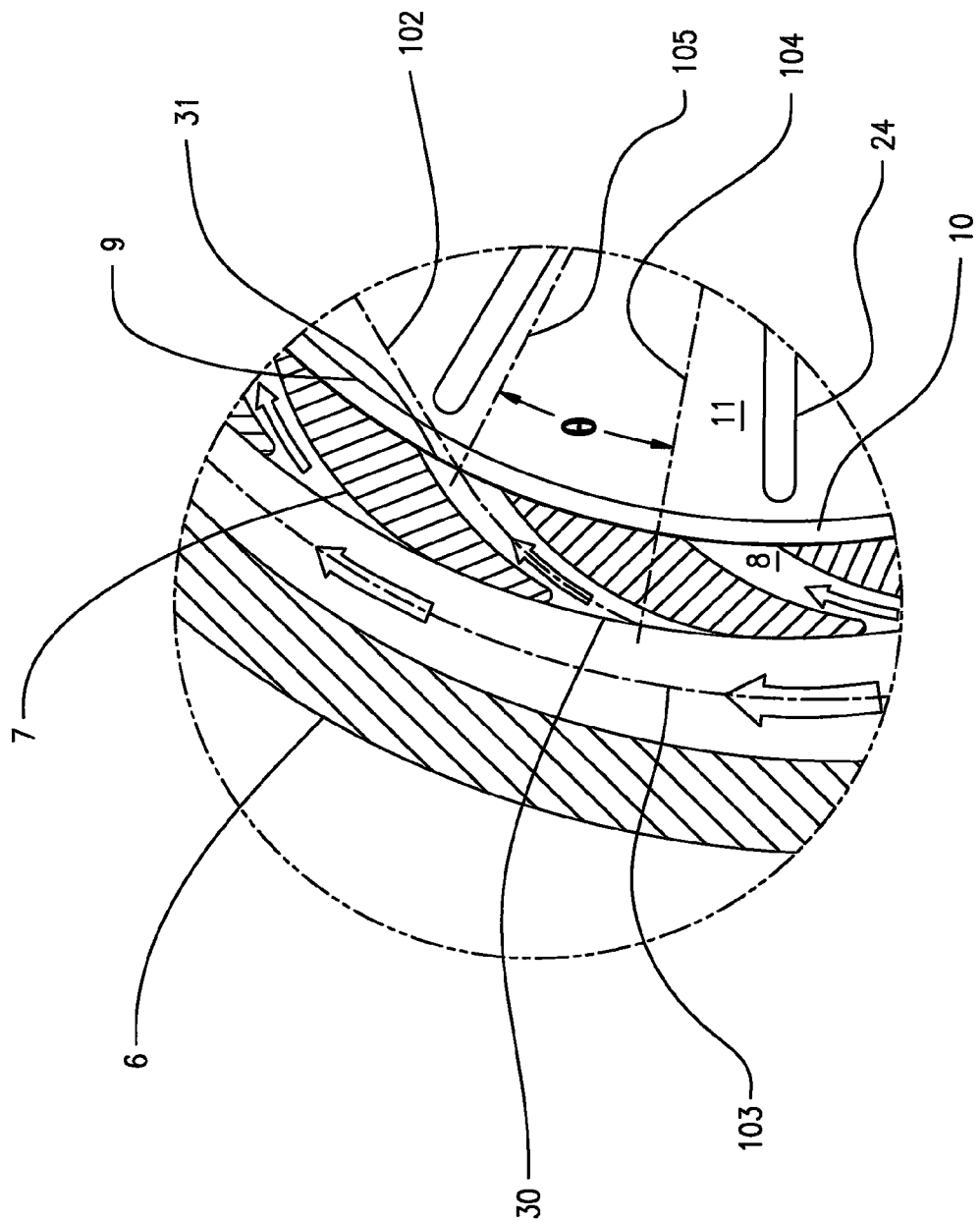
FIG. 8 shows an exploded sectional view of the cylinder selected from FIG. 7.
Figure 9:
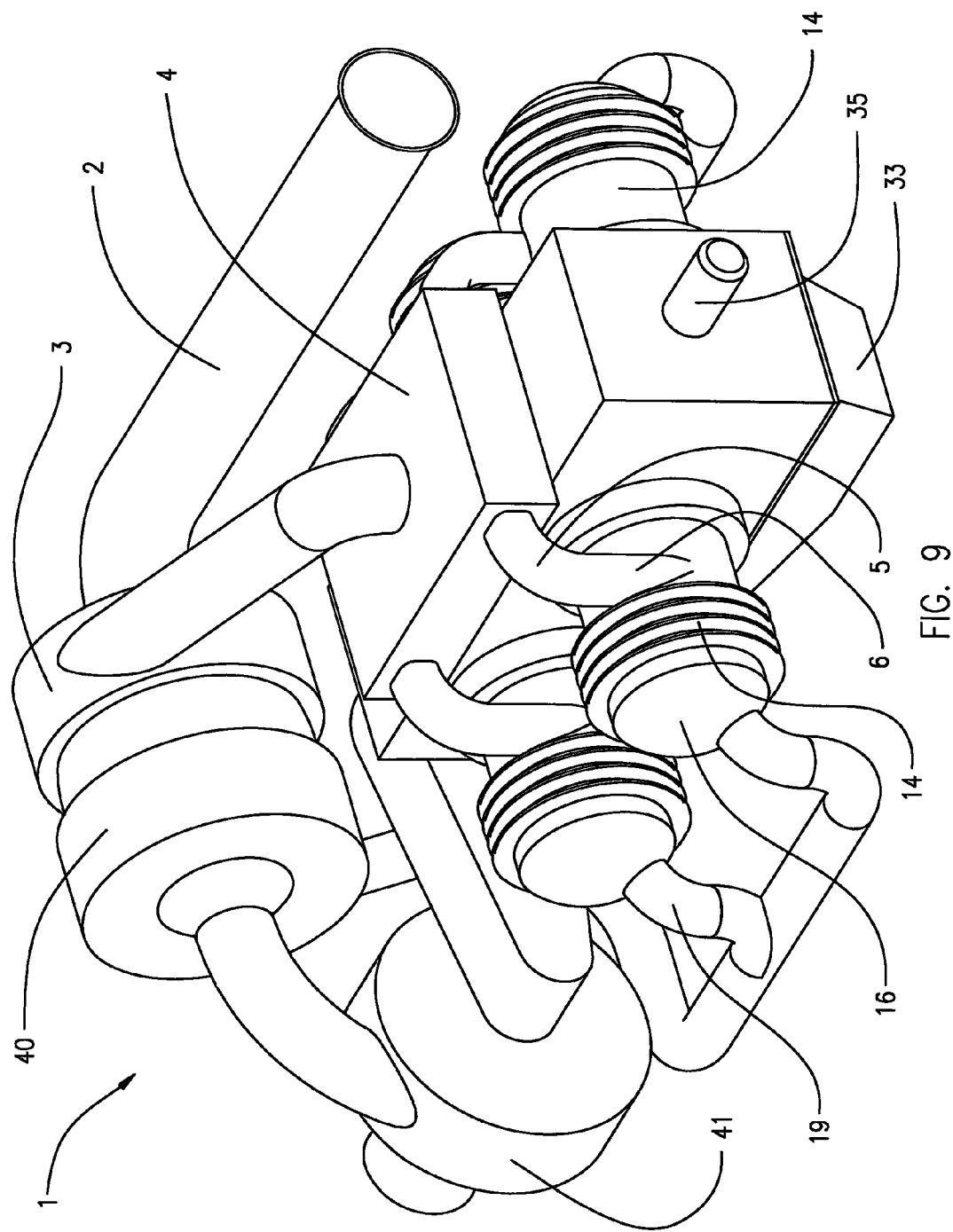
FIG. 9 shows a front perspective view of another embodiment of a turbo-compound, two-stroke uniflow internal combustion (IC) engine of the present invention.
Figure 10:
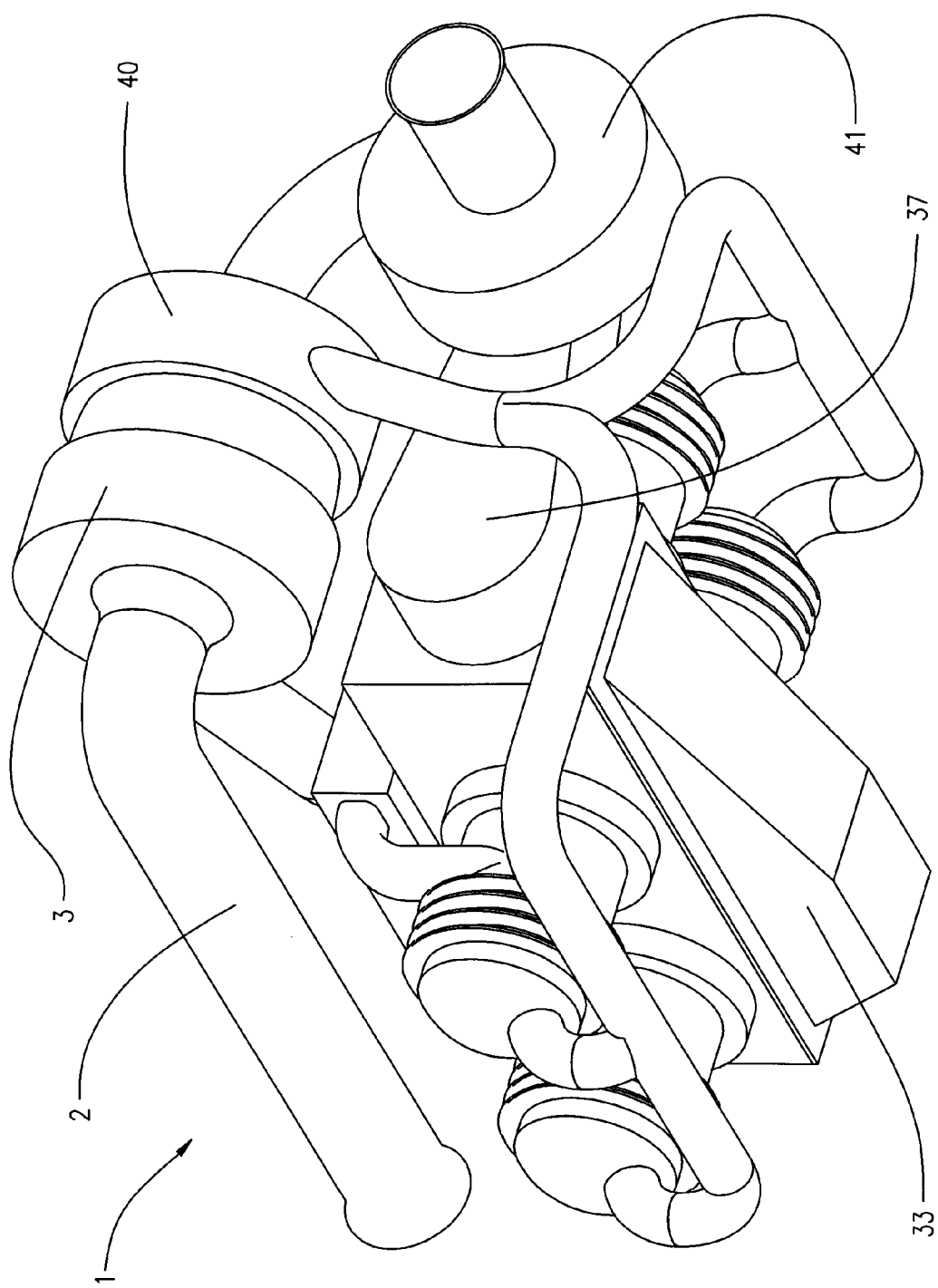
FIG. 10 shows a bottom-rear perspective view of the turbo-compound, two-stroke uniflow internal combustion (IC) engine of FIG. 9.

FIGS. 7 and 8 illustrate a scroll plenum 6 according to an embodiment of the invention, communicating cooled, pressurized inlet air from the air inlet duct 5 to the cylinder chamber 21 (FIG. 3). The scroll plenum 6 defines an enclosed plenum chamber 27 that extends from the inlet air duct 5 in a single direction (shown clockwise in the illustrated view) around the outside of the cylinder wall 15. A plurality of swirl ports 8 formed through the portion of the cylinder wall 15 associated with the scroll plenum 6, provide fluid communication from the scroll plenum 6 into the cylinder chamber 21. The scroll plenum 6 engages the outside surface of the cylinder wall 15 substantially tangentially, and extends in one direction around and along the outside of the cylinder wall 15 to a terminating point 29. The scroll plenum 6 extends substantially 360° around the cylinder 14 from its inlet point 26 to its terminating point 29, although the extension of the scroll plenum can be less than the full circumference of the cylinder.

As shown in FIG. 8, the plurality of swirl ports 8 are defined by a plurality of spaced-apart swirl vanes 7, and have a flow path and a centerline 102. In an aspect of the invention, the swirl port 8 is elongated through the cylinder wall 15 to provide tangential direction to the air flow leaving the swirl port 8 and entering the cylinder chamber 21. The centerline 102 of the swirl port 8 at the inlet 30 is directed away from the centerline 103 of the plenum chamber 21 at an angle of about 10° to about 45°. The pathway of the swirl port 8 from the inlet 30 to the outlet opening 31 are curved up to an angle of about 45°, at least in part to account for the arc angle θ defining the centers of the inlet 30 and outlet openings 31 of the swirl pathway. In the illustrated embodiment shown in FIG. 7, there are sixteen (16) equally sized swirl ports 8 disposed equally spaced around circumference of the cylinder, wherein the angle θ is 22.5°. The centerline 102 of the swirl port 8 at the outlet opening 31 is directed from tangential to the centerline 100 of the cylinder chamber 21 at an angle of about 80° to about 45°. The cross sectional shape of a swirl port includes circular, oval, elliptical, square, rectangular, and other polygonal. To produce a smooth flow of air, the inlet or upstream corners and edges of the swirl ports are rounded.

The cross sectional shape of the plenum chamber 27 is shown as substantially rectangular, although other shapes including semicircular are contemplated by the invention. The plenum chamber 27 is sized and configured, along with the swirl ports 8 around the circumference of the cylinder 14, to deliver an equal mass weight of inlet air through each of the plurality of swirl ports 8, at an equal linear velocity of air through the outlet opening 31 of the swirl ports. As the mass of air flows around the circumference of the plenum 6, an incremental mass portion of air passes out of the plenum chamber and through a swirl port. Consequently, the size of the scroll plenum 6 is tapered between the inlet point 26 and the terminating point 29, with a corresponding reduction in the cross sectional area of the scroll chamber 27 between points 26 and 29. Under ideal conditions, and assuming no pressure losses along the scroll plenum chamber, the plenum chamber transverse area tapers to account for the incremental reduction in the mass of air flowing through each successive swirl port 8, and assuming that the height of the plenum is constant, the width (in plan view) of the scroll plenum chamber is reduced linearly. Under the same ideal conditions, and assuming an equal pressure drop, the size and shape of the pathways of the plurality of swirl ports 8 are equal, and provide the same airflow velocity for the same air mass rate. By using well known computational methods, such as computational fluid dynamics (CFD), the appropriate size and distribution of each individual swirl port (or conversely, swirl vane) and for the scroll plenum can be determined for actual operating conditions, to provide an equal mass weight of air through each of the plurality of swirl ports 8, at an equal linear velocity of air through the outlet opening 31 of the swirl port.

Another embodiment of the two-stroke uniflow internal combustion (IC) engine is shown in FIGS. 9-13. The illustrated engine also includes an supercharger 3 with an air inlet 2, that discharges the compressed air through an intercooler 4 into the inlet 5 for each cylinder 14, exhaust piping 19 from each cylinder that feed into an inflow radial turbine 40 that drives the supercharger 3, and which exhausts to a power turbine 41 that delivers power through a gearbox 37 to the engine driveshaft 35.

Figure 11:
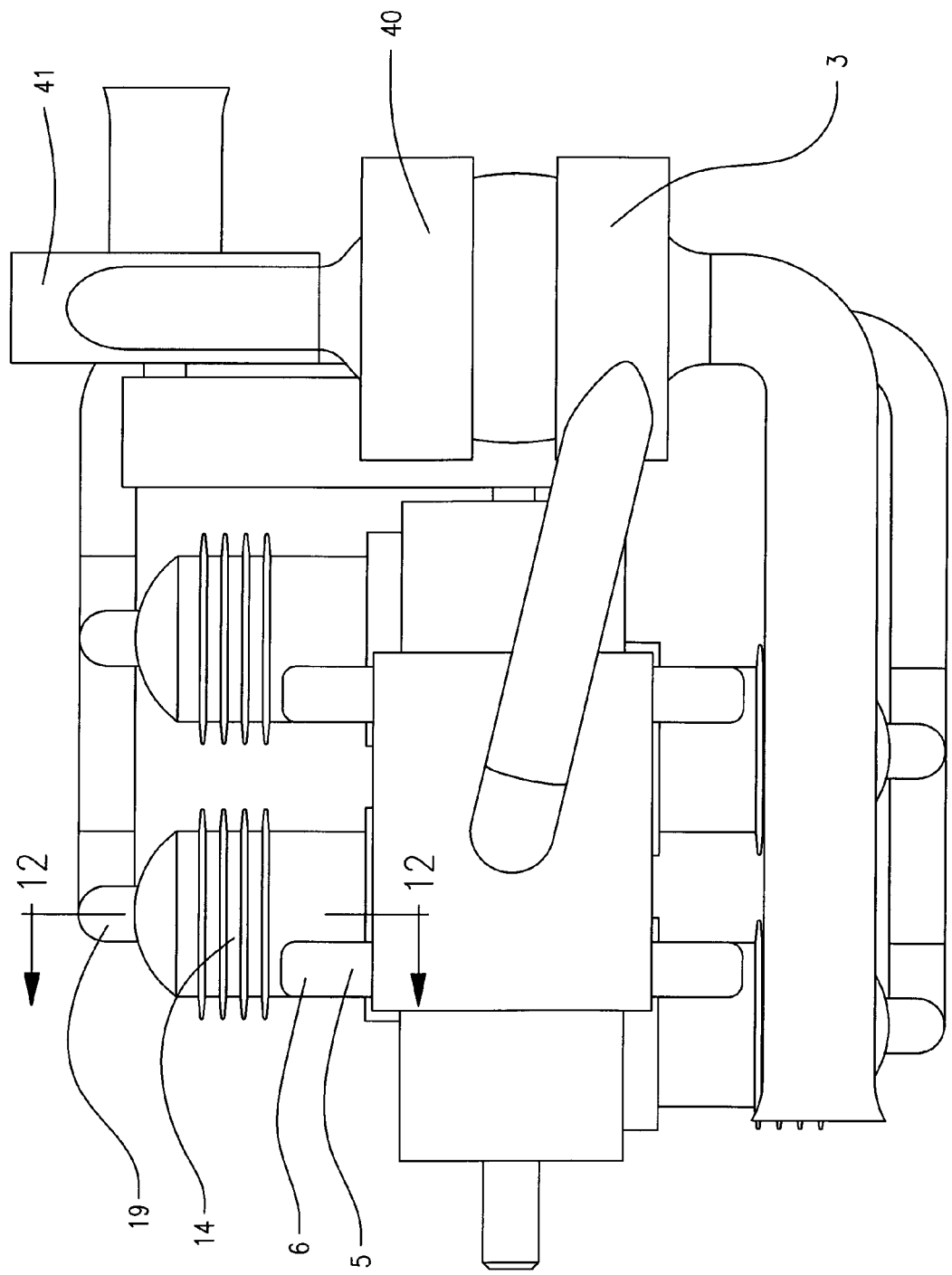
FIG. 11 shows a top plan view of the turbo-compound, two-stroke uniflow internal combustion (IC) engine of FIG. 9.
Figure 12:
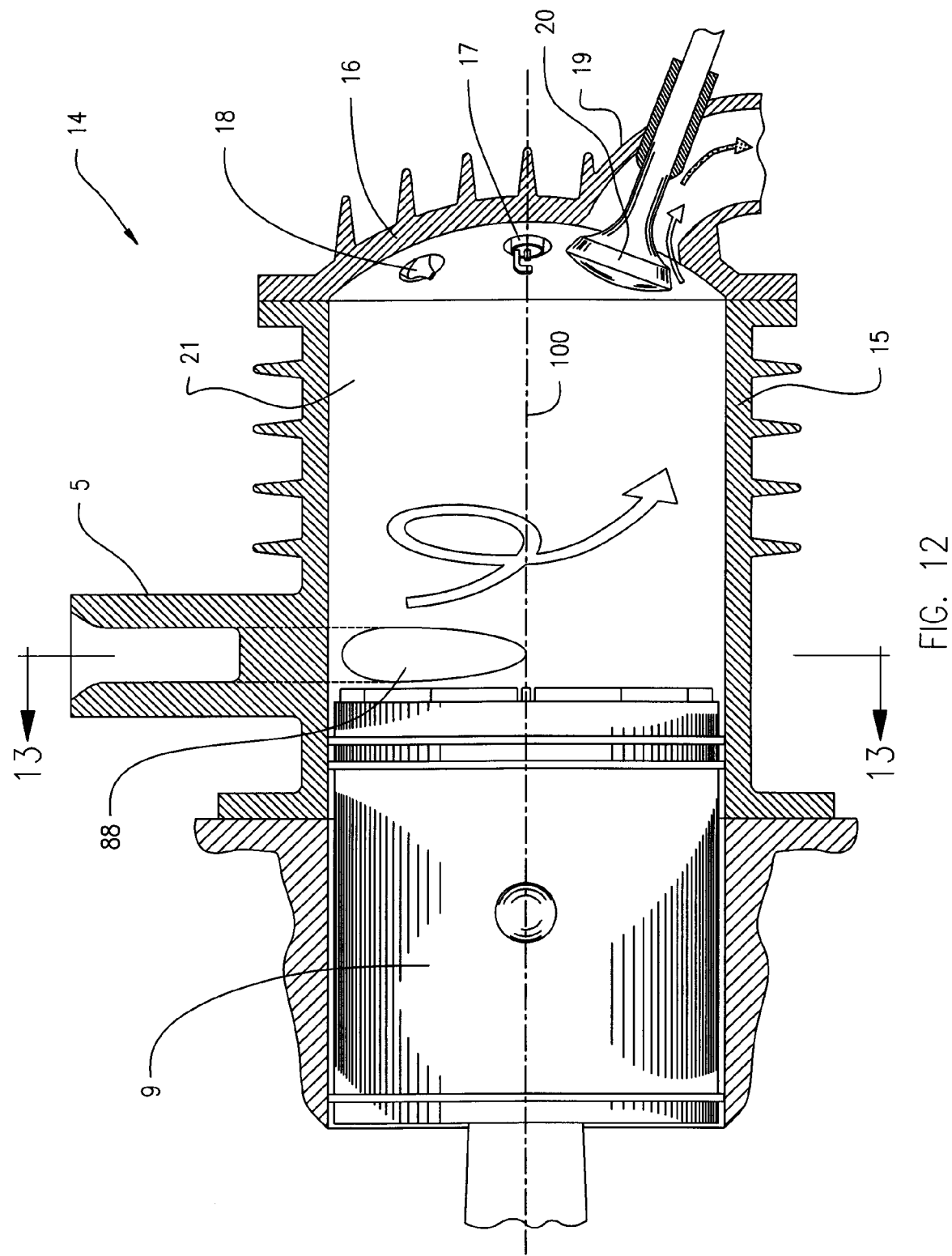
FIG. 12 shows a vertical sectional view through the cylinder of the turbo-compound, two-stroke uniflow internal combustion (IC) engine of FIG. 11 through line 12-12.
Figure 13:
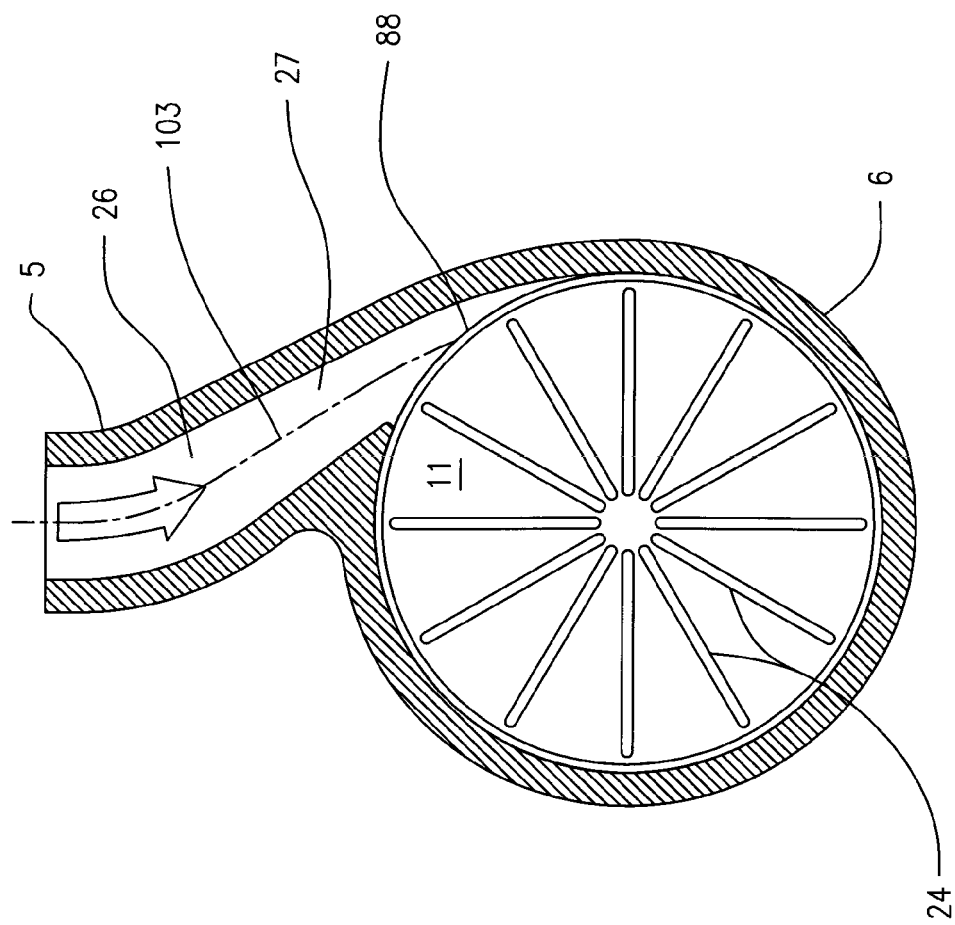
FIG. 13 shows a horizontal sectional view down through the cylinder taken through line 13-13 of FIG. 11.

As shown in FIGS. 11-13, each cylinder including an inlet air duct 5 that delivers inlet air to a plenum 6 that communicates with the cylinder chamber 21 through a single swirl port 88. FIG. 12 shows a single swirl port 88 to provide the tangential upward airflow within the cylinder that aids the intimate mixing of the stratified charging of the fuel with air. The scroll chamber 27 extends only a portion of the circumference of the cylinder, and engages the outside surface of the cylinder wall 15 substantially tangentially. The single port opening 88 extends through the cylinder wall 15 only a portion of the circumference, typically up to about 90°. The single swirl port 88 is elongated through the cylinder wall 15, with its centerline 103 entering the cylinder chamber 31 tangential to the radius at an angle of about 45° to about 80°, to provide tangential inlet air flow. Tapering of the scroll chamber 27 toward the inlet port 88 reduces the cross sectional area for inlet air flow, which increases the inlet air velocity, for achieving sufficient and effective air swirl within the cylinder chamber 21

A typical swirl velocity, defined as the average velocity of the air exiting the swirl port 88 or swirl ports 8 and entering the cylinder chamber 21 is about 500 feet per second, with a pressure drop of up to about 4%. The swirl velocity ratio, defined as the ratio of the swirl velocity to the average upward air velocity through the cylinder, has been shown to correlate with maximum cylinder pressure achieved in a uniflow scavenged cylinder design.

The swirl port 88, or plurality of swirl ports 8 of FIG. 7) can be formed through the cylinder wall 15 by a number of means including wire electrical discharge machining (wire EDM), drilling, and broaching. Alternatively, the plurality of swirl ports 8 can be formed by positioning and fixing the plurality of swirl vanes 7 between two sections of cylinder wall 15.

As shown in FIGS. 4 and 7, each piston 9 includes a piston top 11 and piston rings 10 disposed within annular grooves in the sidewall of the piston 9. The top 11 of the piston includes a plurality of auxiliary vanes 24 oriented in a radial direction from the center of the piston, and transverse to the direction of the single swirl port 88 or plurality of swirl ports 8 to increase the turbulence of the scavenging air that swirls upward within the cylinder chamber 21. The number of auxiliary vanes can be the same as or different from the number of swirl ports 8, when a plurality are used, though typically number from 8-12, equally spaced. The auxiliary vanes have elongates side walls 25 extending axially from, and radially to proximate the edge of, the piston top 11, to help effect an upward turning of the swirling air flow, and to generate turbulence for air-fuel mixing.

Low Pressure Supercharger

Figure 19:
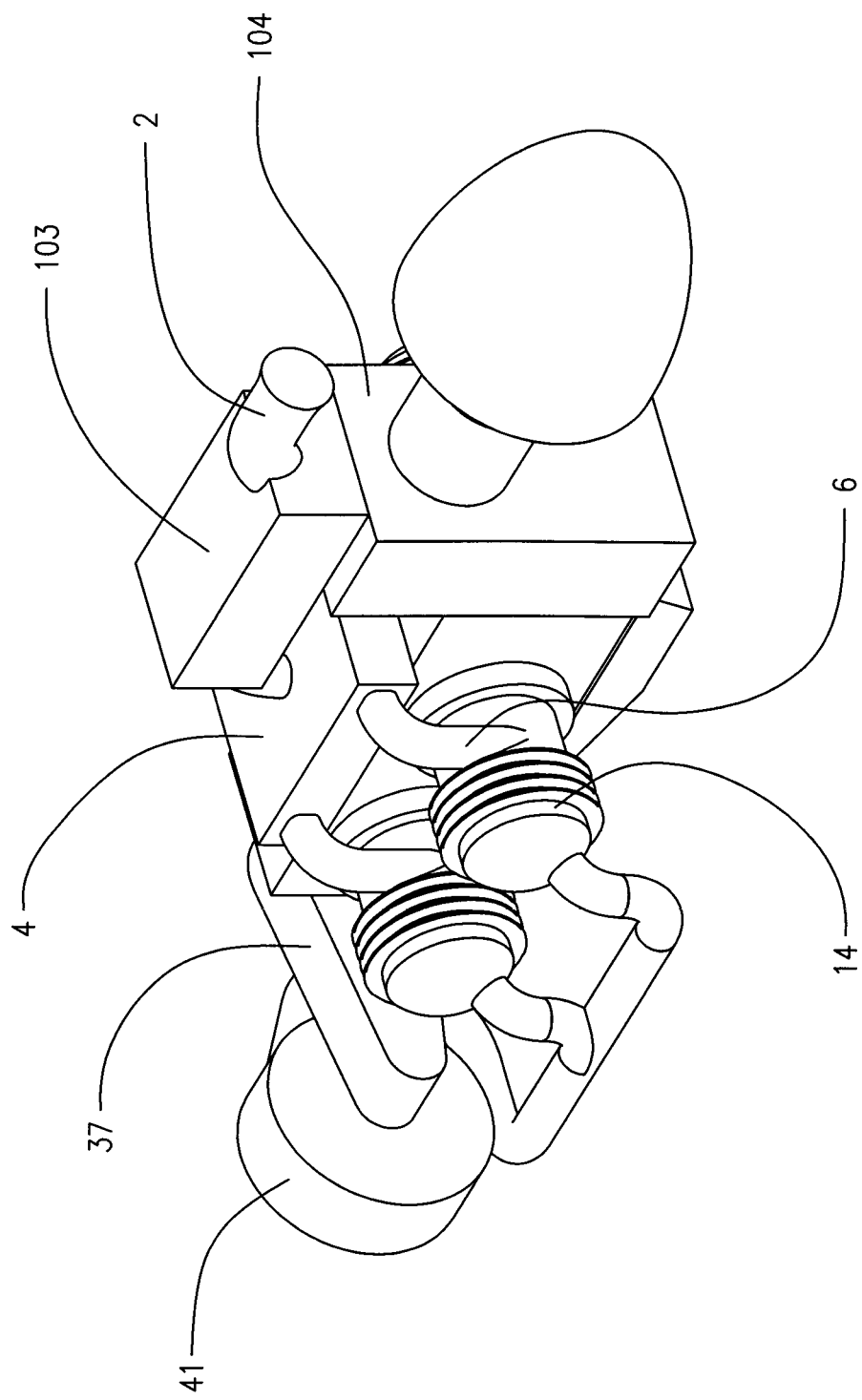
FIG. 19 shows a front perspective view of a uniflow internal combustion engine that includes a low pressure positive displacement compressor.
Figure 20:
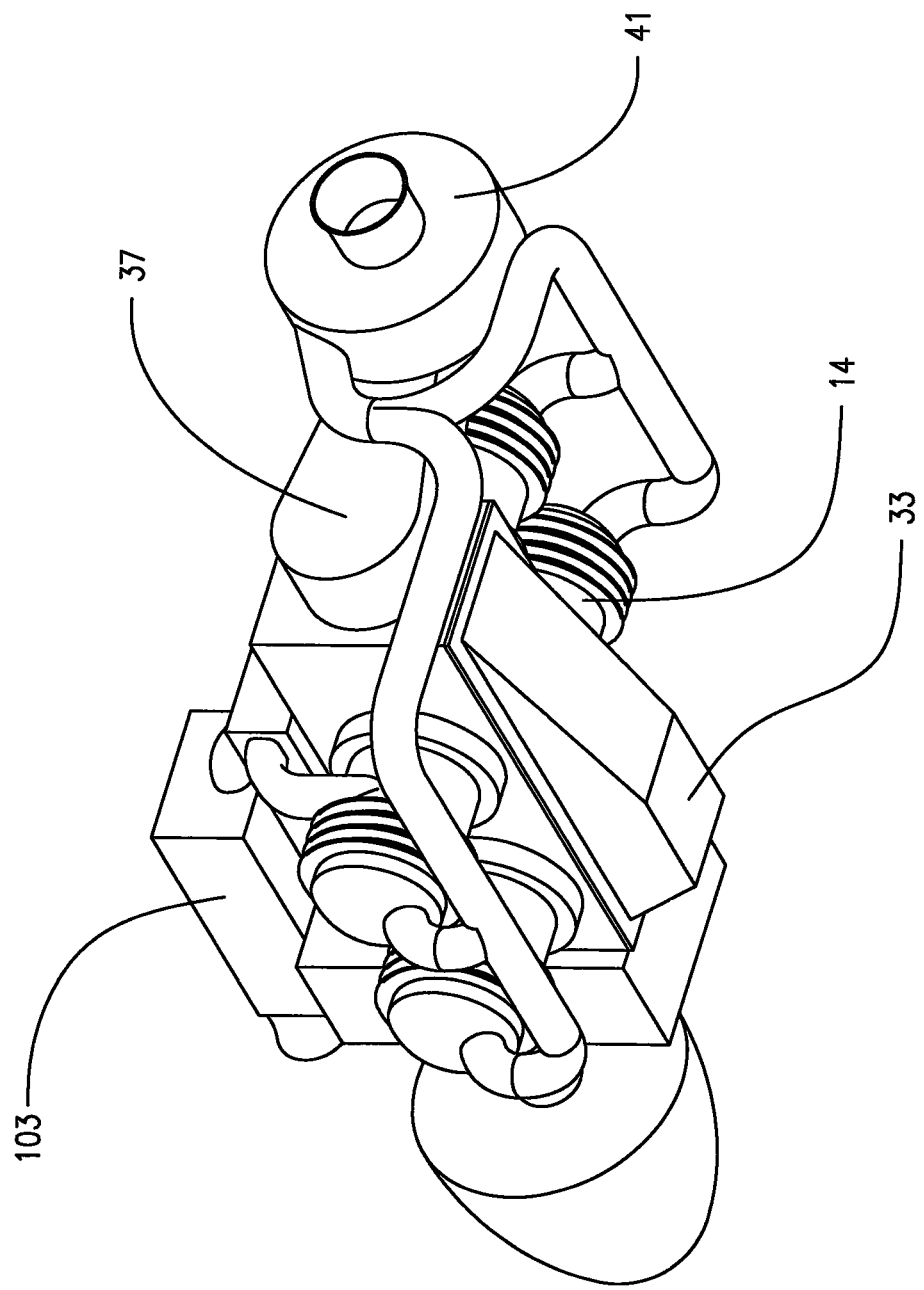
FIG. 20 shows the bottom-rear perspective view of the uniflow internal combustion engine of FIG. 19.
Figure 21:
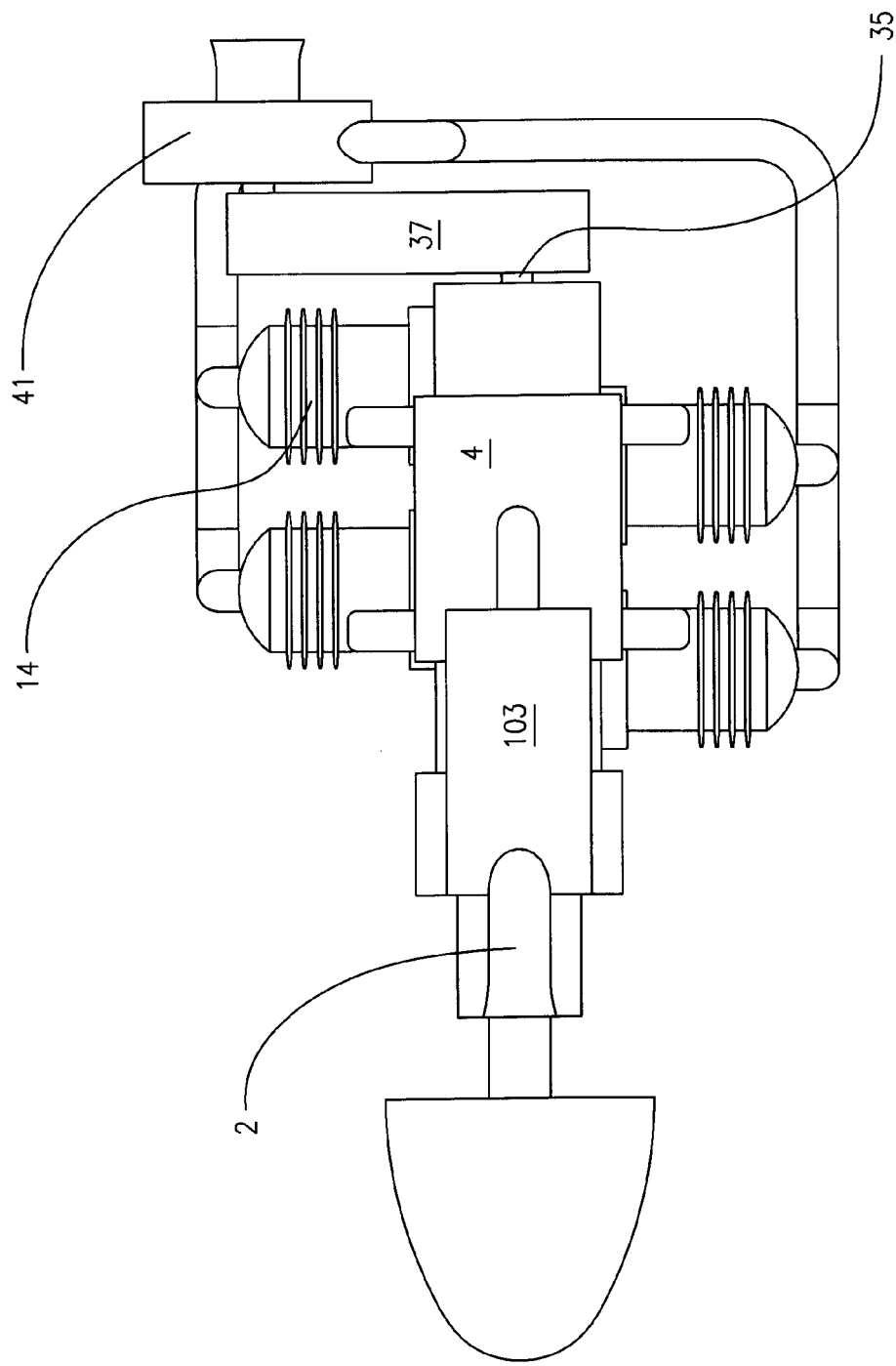
FIG. 21 shows the top plan view of the uniflow internal combustion engine of FIG. 19.

As shown in FIGS. 19-21, an alternative embodiment of a two-stroke uniflow IC engine of the present invention can employ a low pressure ratio (about 1.25-3 ratio, outlet:inlet) supercharger 103 that is geared to the engine crankshaft 35 (gearbox 104) and draws in ambient inlet air through an air intake pipe 2 and discharges the compressed (heated) air to an intercooler 4, which discharges the cooled (densified) compressed inlet air to the engine intake pipes 6. The low pressure supercharger replaces the high pressure turbocharger (high pressure supercharger powered by a high pressure in-flow turbine that is driven by high pressure exhaust gases). The low pressure supercharger 103 can include positive displacement discharge of air that when driven directly by the crankshaft of the engine, provides a mass rate of compressed air proportional to the engine rotational speed. In this embodiment, the pressures throughout the cycle are shifted lower than when using a turbocharger, in view of the lower inlet air pressure. An example of a low pressure supercharger is a Lysholm twin-screw supercharger, available from Vortech Engineering. In this embodiment, the exhaust gases exit the cylinders 14 and expand into a low pressure power turbine 41 that powers via gears the crankshaft 35 of the IC engine.

A Radial Cylinder Engine

Figure 16:
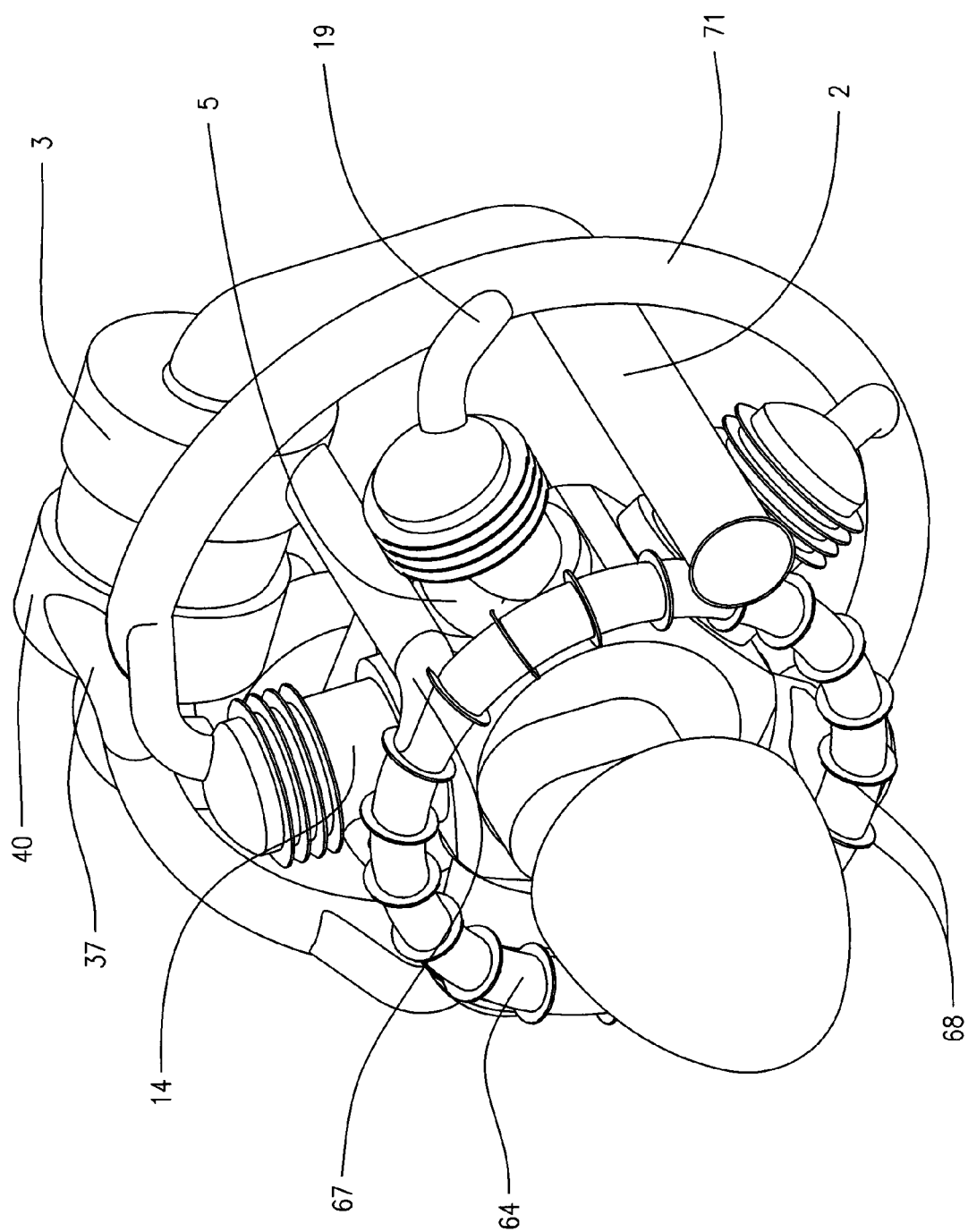
FIG. 16 shows a front perspective view of a radial internal combustion engine according to the present invention that includes a plurality of the radially-arranged uniflow engine cylinders, including an annular inlet air manifold and an annular exhaust air manifold.
Figure 17:
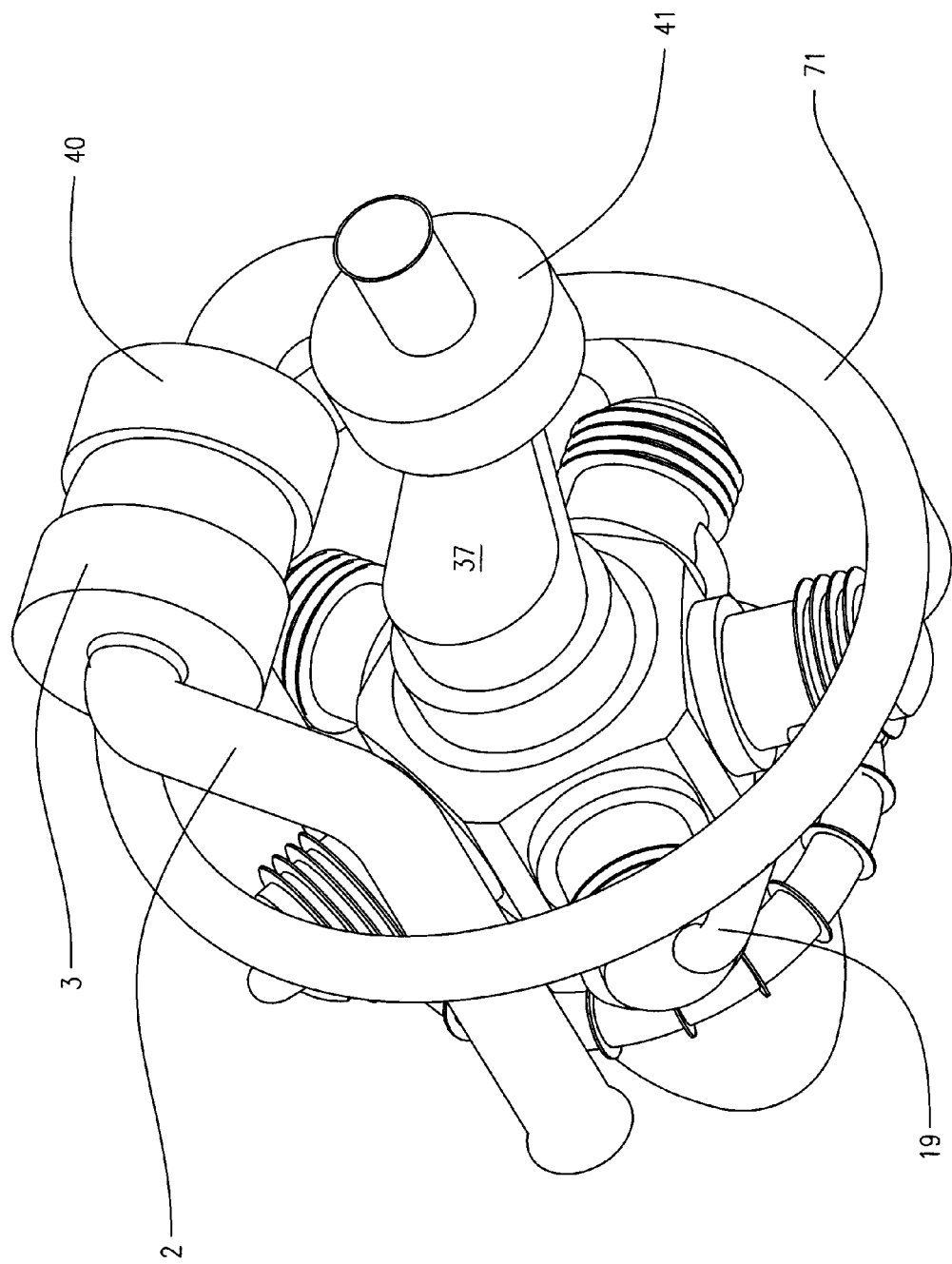
FIG. 17 shows the bottom-rear perspective view of the radial internal combustion engine of FIG. 16.
Figure 18:
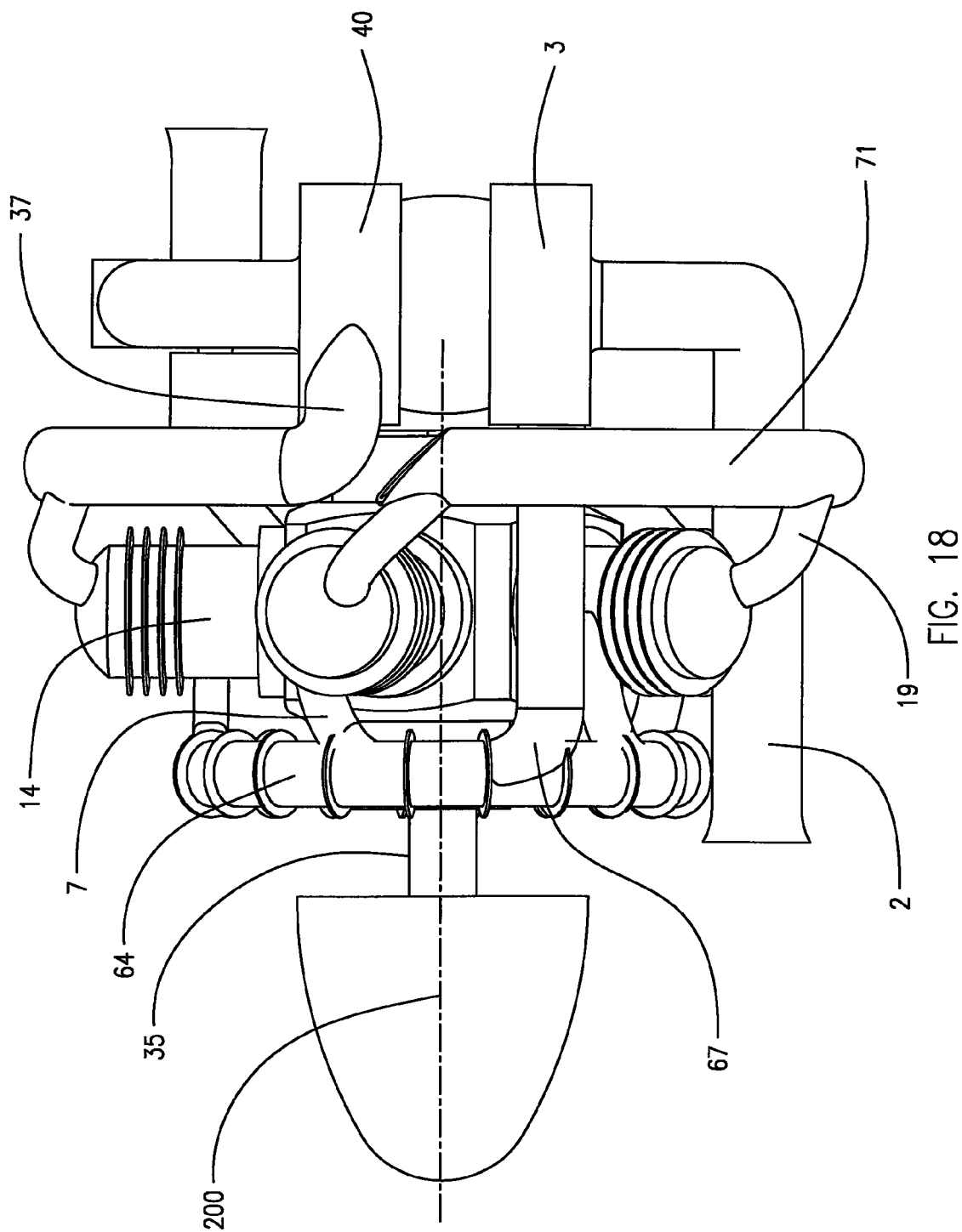
FIG. 18 shows the top plan view of the radial internal combustion engine of FIG. 16.

Another embodiment of the two-stroke uniflow engine of the present invention shown in FIG. 16-18, illustrating a radial, engine that includes a plurality of uniflow engine cylinders 14 arranged radially and equidistantly circumferentially around a common engine axis 200, including an annular inlet air manifold 64, and an annular exhaust air manifold 71. Since each cylinder is a two-stroke cylinder, which fires or has a power stroke on each revolution, the cylinders can be fired in sequential order and an even number (preferably) or odd number of cylinders can be employed. Although the illustrated engine shows five cylinders, any number of 3, 4 or more cylinders can be used.

Ambient air is drawn in through the an air intake 2 of a supercharger compressor 3, which discharges compressed air into an engine intake pipe 67 that tangentially transitions the compressed inlet air in a circumferential direction along the annular axis of the annular inlet air manifold 64. The annular inlet air manifold 64 lies in a plane parallel with the plurality of axes 100 of the radially-arranged cylinders 14 and along a path that passes near the center of each cylinder 14. The outer surface of the annular inlet air manifold can include cooling fins 68 for intercooling the compressed air flow from the supercharger compressor 3, to densify the air. In addition, or alternatively, an air inter-cooling unit (not shown) can cool the compressed air before its entering of the annular inlet air manifold, thereby further cooling the compressed inlet air to increase its density, and delivering more oxygen into the cylinder for combustion. The compressed inlet air flows continuously around the annular inlet air manifold 64 until drawn therefrom into each cylinder 14 as demanded during the cylinder's air inlet portion of the cycle. An inlet air discharge port 7 directs a portion of the circulating flow of pressurized inlet air into the tangential inlet plenum 6 of each cylinder 14 (as shown in FIG. 13). An optional scoop or partition can be positioned within the annular inlet air manifold at the air discharge port 67 to reduce pressure loss and maintain air velocity. The cross-sectional shape of the interior of the annular inlet air manifold is typically of an oval to reduce pressure losses. The outer surface of the annular inlet air manifold can include cooling fins 68 for intercooling the compressed air flow from the supercharger compressor 3.

Exhaust gases exit each cylinder 14 through the exhaust port 19 in the cylinder head 16, which enters into an annular exhaust gas manifold 71 through a tangential entry pipe to minimize pressure losses. The annular exhaust gas manifold 71 starts at the exhaust outlet duct 19 of one of the cylinders, typically at the top, and continues along a circumferential path near the top of each cylinder, with the exhaust outlet ducts 19 of the successive cylinders 14 exhausting tangentially into the annular exhaust gas manifold 71. The annular exhaust gas manifold 71 discharges at its terminal end into the inlet scroll 37 of a radial inflow turbine 40 that extracts a portion of the energy of the high pressure exhaust gases to drive the supercharger 3. The reduced pressure exhaust gas exiting the radial inflow turbine 40 then passes through a radial power turbine 41 that mechanically drives the crankshaft 35, to extract additional work from the reduced pressure exhaust gases before their venting to atmosphere. The driving unit 37 can be a speed-reducing sprocket gears, including a clutch drive coupling.

The exhaust valve can be a conventional poppet valve which opens and closes using conventional camshaft actuation. Electromechanical valve control can be used to adjust and control the opening and closing of the exhaust valve more rapidly. Examples of devices for achieving variable opening and/or closing of the exhaust valve are given in U.S. Pat. Nos. 6,257,190, 6,053,134, 5,537,961, 5,103,779, whose disclosures of which are incorporated by reference herein in their entirety. Further, a programmed solenoid can be used to fully open the exhaust valve 20 in each cylinder at cold engine starting conditions which reduces initial cylinder compression pressure.

The design and sizing of the swirl port or plurality of swirl ports can be specified for a particular engine design and fuel source using computational fluid dynamics (CFD). The number of swirl ports 8 and corresponding inlet vanes 7 can number up to hundreds, and more typically numbers between about 12 and 48.

In an aspect of the invention, a lean burning air-fuel mixture is provided to improve fuel efficiency and power generation, through more efficient lean burning of the fuel, and through improved thermal efficiency. Typically, the benefits of leaner burning of fuel include improved fuel efficiency, lower emissions and reduced heat losses. The theoretical lean mixture can be as low as 0.04. A preferred range for lean burning is about 0.2 to about 0.8, including 0.3, 0.4, 0.5 0.6 and 0.7.

The IC engine of the present invention can employ an electronic control module (ECM) or electronic control unit (ECU) to control the timing and quantity of fuel delivery, relative to the amount (mass) of inlet air within the cylinder chamber, to achieve lean burning. The ECM/ECU receives an engine speed signal, as well as other operating parameters such as intake manifold pressure and fuel temperature, from a sensor and controls the amount of fuel an start of injection timing through actuators to maximize power and efficiency and minimize emissions.

The Two Stroke Cycle

The two stroke diesel cycle includes an air intake phase, a compression stroke, a fuel injection phase, an ignition and combustion phase, a power stroke, and an exhaust phase. In the illustrated embodiment of the invention, a complete cycle includes only the two strokes of the piston within the cylinder, and one complete rotation of a crankshaft 35 to which a piston rod joins the piston 9. The invention provides a method of operating the IC engine that includes repeating the cylinder cycle tens to hundreds of time per second.

The Cycle for Opposed Horizontal Cylinders Engine with Turbocharger

Figure 27:
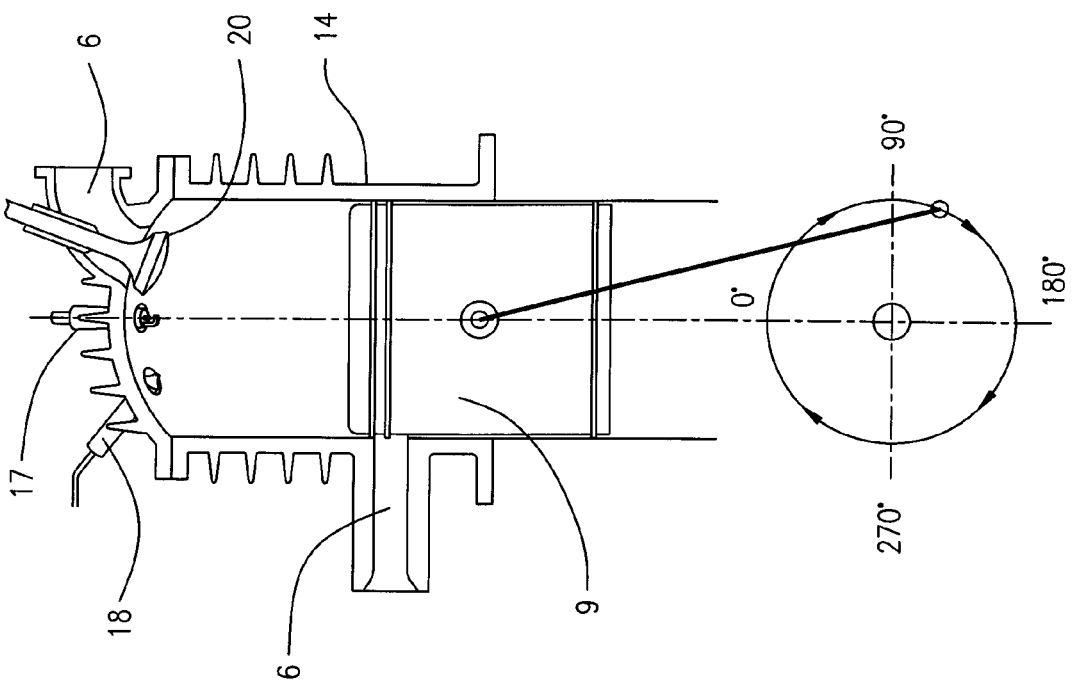
FIG. 27 shows a schematic diagram of the uniflow cylinder showing the crank angle position with the inlet air swirl port and exhaust valve opened.
Figure 28:
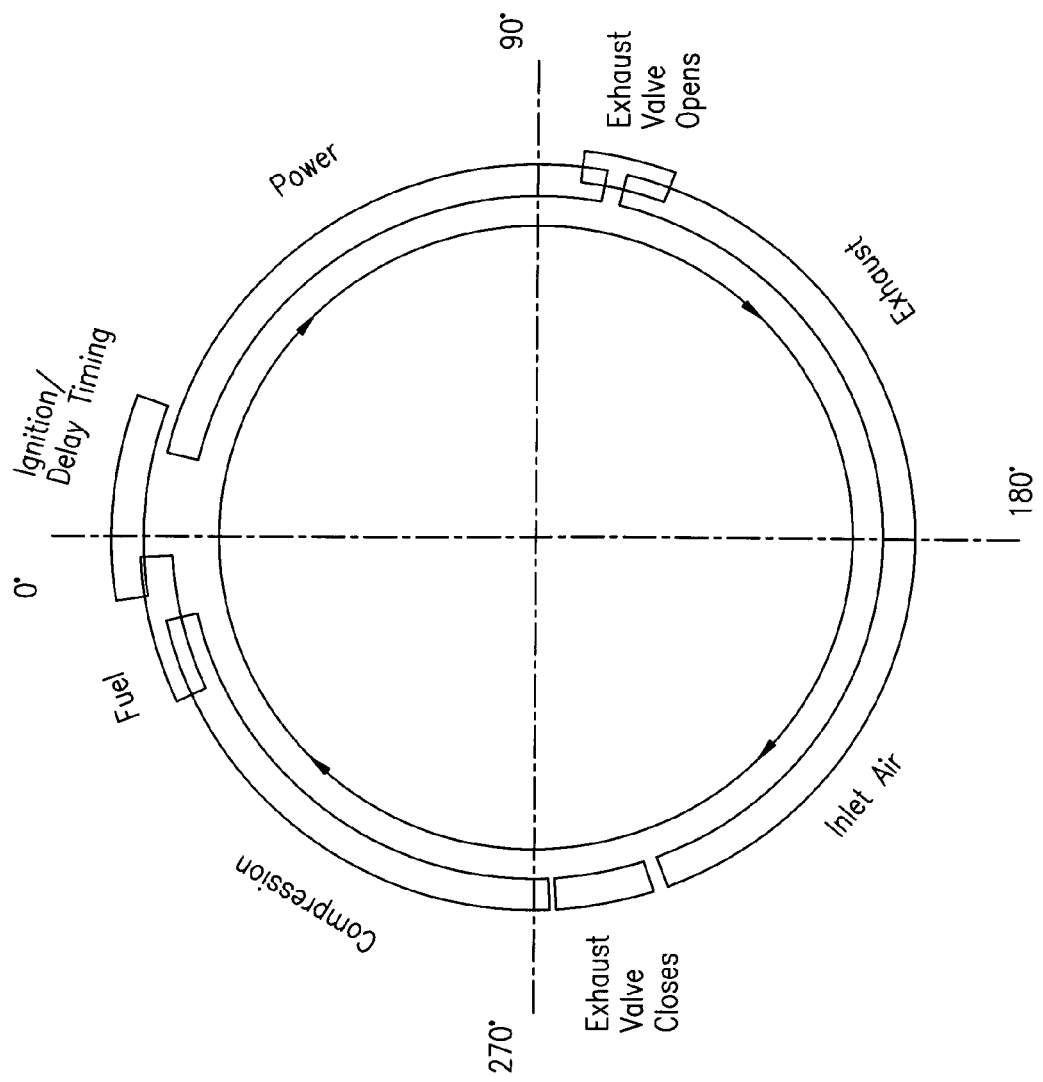
FIG. 28 shows a schematic diagram of the crank angle through the phases of the cylinder cycle.

A cycle of the two-stroke IC engine of the invention is illustrated in FIGS. 3-6, FIGS. 22-27, and FIG. 28. FIGS. 3-4 illustrate the components of the cylinder 14 through one cycle. FIGS. 22-27 shows schematic diagram of the uniflow cylinder showing the crank angle position of the crankshaft with the piston stroke position within the cylinder the various phases or positions of the cycle. FIG. 28 shows a schematic diagram of the crank angle through the phases of the cylinder cycle.

Figure 22:
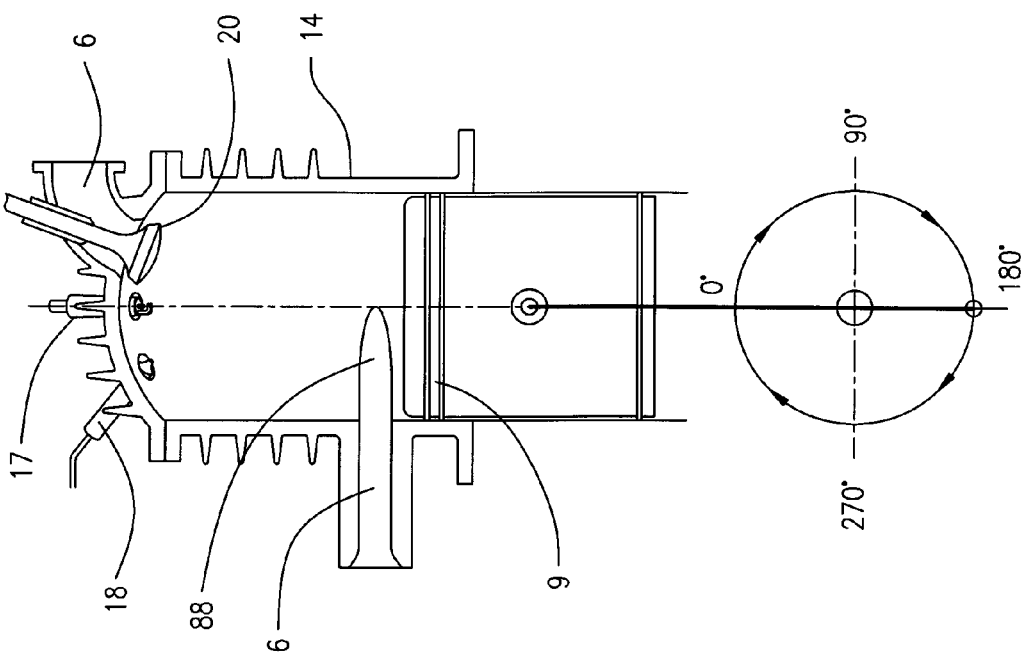
FIG. 22 shows a schematic diagram of the uniflow cylinder showing the crank angle position with the piston stroke at the bottom dead center position.

A portion of the air intake and scavenging phase is illustrated in FIG. 3 and FIG. 22. Preceding the scavenging of inlet air into the cylinder, ambient air at ambient temperature and pressure is compressed by an inlet air supercharger. The supercharger is an air compressor used for forced induction of fresh air into the internal combustion engine. The greater mass flow-rate and higher pressure of the inducted air provides more oxygen to support combustion than would be available in a naturally-aspirated engine, which allows more fuel to be provided and more work to be done per cycle, increasing the power output of the engine. The greater mass flow rate of air also enables operation of the cylinder in a lean burning condition. The compression of the ambient air also raises its temperature, so an after-cooler unit is, typically used to remove heat and increases the density, bringing the after-cooled compressed inlet air to reduce the air temperature and the air density.

FIGS. 3 and 22 shows the piston 9 having arrived at the bottom of its reciprocal stroke (180° crank angle) within the cylinder 14, and supercharged, cooled high pressure inlet air surges under pressure through the uncovered swirl port 88 or swirl ports 8, and into the bottom of cylinder chamber 21. The surging, pressurized inlet air expands and swirls in tangential turbulent unidirectional flow that spirals upwardly throughout the cylinder chamber 21. The exhaust valve 20 remains open to provide scavenging of the cylinder chamber with inlet air, until combustion gases (from the last combustion phase and power stroke) have been substantially completely exhausted through the exhaust port 22.

Figure 23:
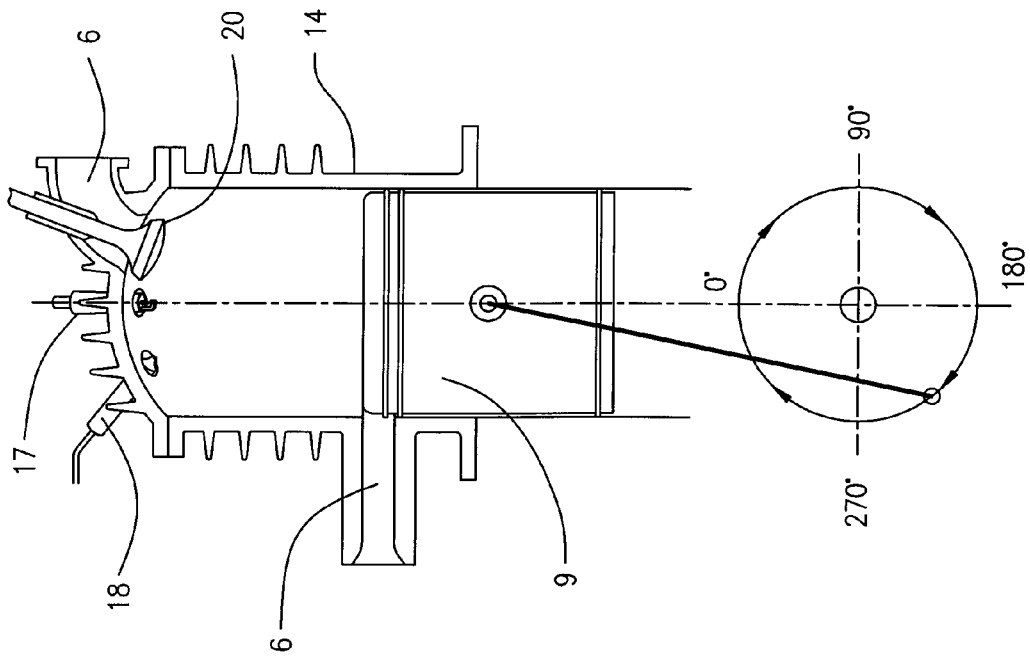
FIG. 23 shows a schematic diagram of the uniflow cylinder showing the crank angle position with the piston closing the inlet air swirl port, following the closure of the exhaust valve.

FIG. 23 shows the initial closing of the inlet air port 88 by the piston 9 as it moves upward within the cylinder. At this point in the cycle, the exhaust valve 20 remains open to allow some of the scavenging inlet air to flow upwardly through the exhaust port 22 and out the exhaust duct 19, before the exhaust valve 20 closes. By holding open the exhaust valve 20 and allowing some of the inlet air to flow completely through the exhaust port 22 and out the exhaust duct 19, the combustion gas (exhaust gas) temperature is reduced, which reduces the formation of nitrous oxides (NOx) and cools the cylinder all and head.

Figure 24:
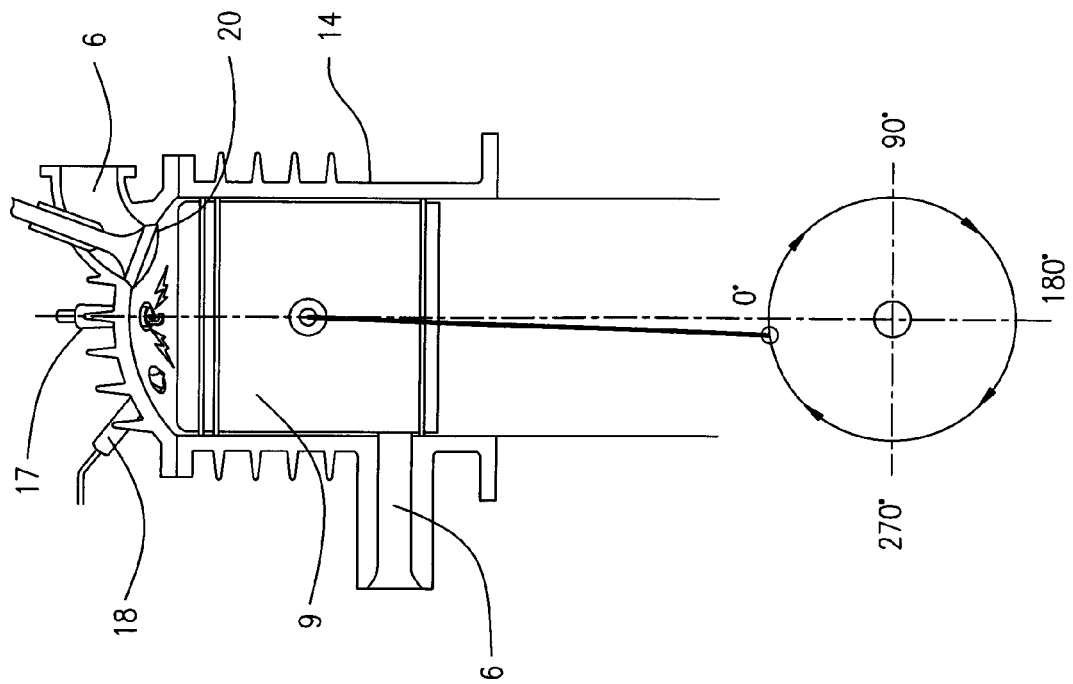
FIG. 24 shows a schematic diagram of the uniflow cylinder showing the crank angle position with the piston approaching the end of the compression stroke with injection of fuel.

FIGS. 4 and 24 show the closure, of the exhaust valve 20, and the initiation of the compression phase. At this point, both the inlet air port and the exhaust ports are closed. The piston advancing within the cylinder toward the cylinder head captures the inlet air and establish a sealed cylinder chamber 21. Preferably the exhaust valve closes at or after the closure of the inlet swirl port(s). As the piston is driven to its top dead center position, shown in FIGS. 5 and 25, the inlet air is further compressed from an initial cylinder pressure to a high compression pressure. The compression ratio, typically of about 8:1 to about 12:1, causes a significant air temperature increase. The power for the compression stroke is provided by the other cylinders of the engine.

Typically near the end of the compression phase, combustible fuel is dispensed into the top of the cylinder chamber 21 by fuel injector 18. The fuel, including gasoline, diesel, or another combustible liquid fuel, is injected by dispersion or spraying slightly downwardly in the same tangential direction as the flow of the turbulent, swirling air, providing intimate air-fuel mixing. The fuel injector injects the fuel in the downstream direction of the aforementioned swirl flow, and upstream of the spark means, at a 10° to 30° angle with respect to the inside surface of the cylinder head. The rapid and intimate mixing of fuel and air provides a shorter combustion delay time with more of the energy of combustion being released at the top of the stroke, which allows for high thermal efficiency and completes the combustion process as early as possible in the expansion or power stroke, and allows for a more complete combustion of the fuel. The quantity of the fuel injected per cycle is selected and dispensed to provide a lean-burning fuel to air ratio in the range of about 0.04 to about 0.8, more typically about 0.2 to about 0.8.

Figure 25:
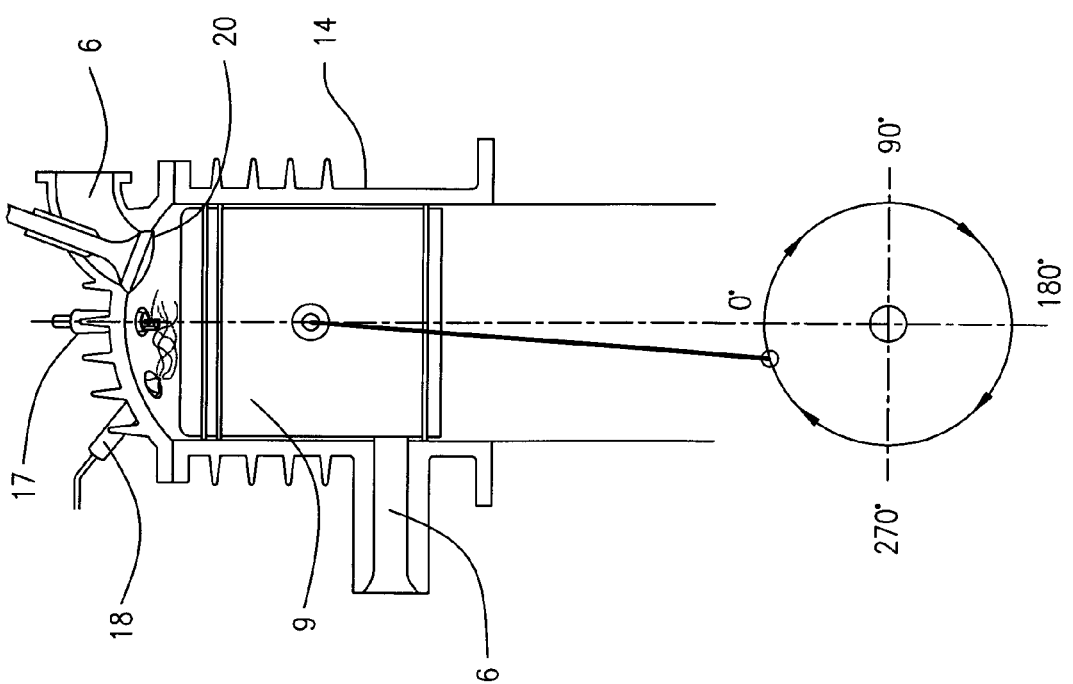
FIG. 25 shows a schematic diagram of the uniflow cylinder showing the crank angle position with the piston approaching top dead center with firing of the spark means.
Figure 26:
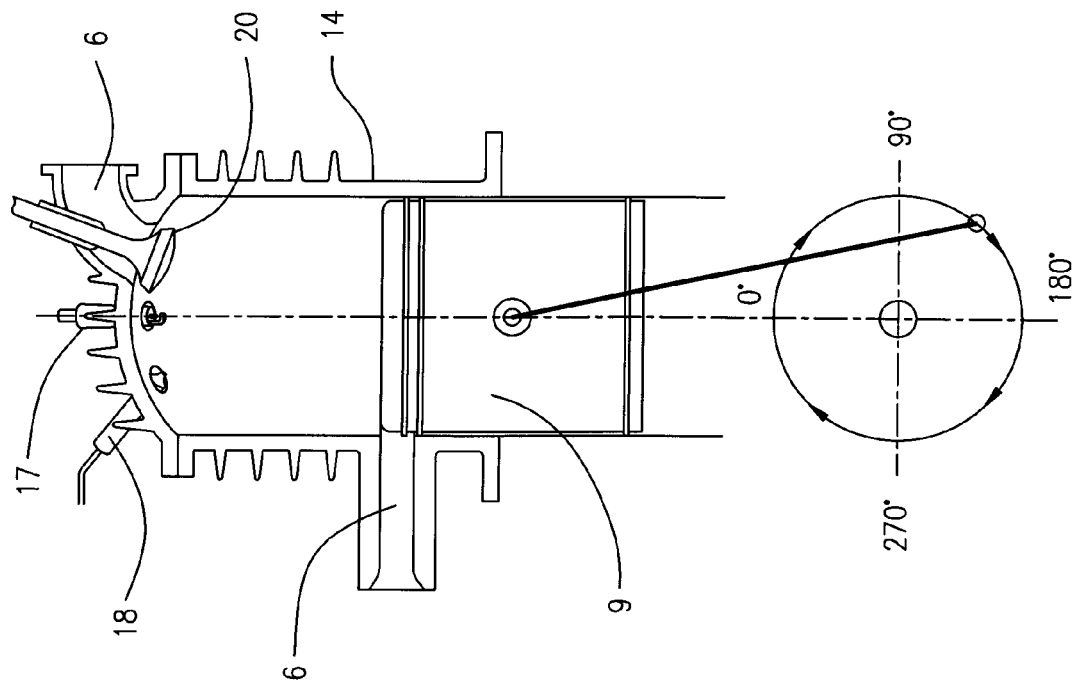
FIG. 26 shows a schematic diagram of the uniflow cylinder showing the crank angle position with the piston approaching the end of the power stroke, with the exhaust valve opened.

The ignition and combustion phases are illustrated in FIGS. 5 and 25, showing the ignition and combustion of the air/fuel mixture. A high energy spark igniter 17 (commonly referred to as a spark plug) can be used to emit a spark that ensures ignition and combustion of the stratified charge of the air-fuel mixture. The combustion of the fuel initiates the power stroke, with the rapidly expanding combustion gases, driving the piston 9 through toward the end of the power stroke, shown in FIG. 26, and expanding the cylinder chamber 21. The start of the fuel injection phase precedes the ignition phase, although the injection of fuel can also continue after the ignition and during the combustion delay time.

FIGS. 6 and 27 shows the completion of the power phase and the initiation of the exhaust phase, whereat the expanding combustion gases have driven the piston downward through the power stroke along the length of the cylinder, filling the cylinder chamber 21 with pressurized combustion gases. As the piston 9 moves toward the bottom of the stroke, the exhaust valve 20 opens, which initiates the exhausting of high pressure combustion gases from the cylinder. After the exhaust valve has opened and exhausting of combustion gases has initiated, the cylinder proceeds downward and uncovered the swirl port 88 (or swirl ports 8), initiate the scavenging by pressurized inlet, air of the combustion gases out the exhaust port 22 and exhaust duct 19. Typically the exhaust valve opens and initiates the exhaust phase before the inlet air ports are opened. The exhaust valve 20 is shown in FIG. 6 as a sodium-cooled poppet valve as described in well known references. The escaping exhaust, gas expands and drives the radial inflow turbine 40, which powers the inlet air supercharge 3, with the reduced pressure exhaust from the turbine 40 then driving a low pressure power turbine 41. The low pressure power turbine 41 delivers power to the drive shaft 35 through a gearbox 37. The discharge of the further-reduced pressure exhaust gases from the tailpipe at about 1000° F., to the environment. The scavenging phase continues back to the bottom dead center position.

The Cycle for a Radial Cylinders Engine

Figure 15:
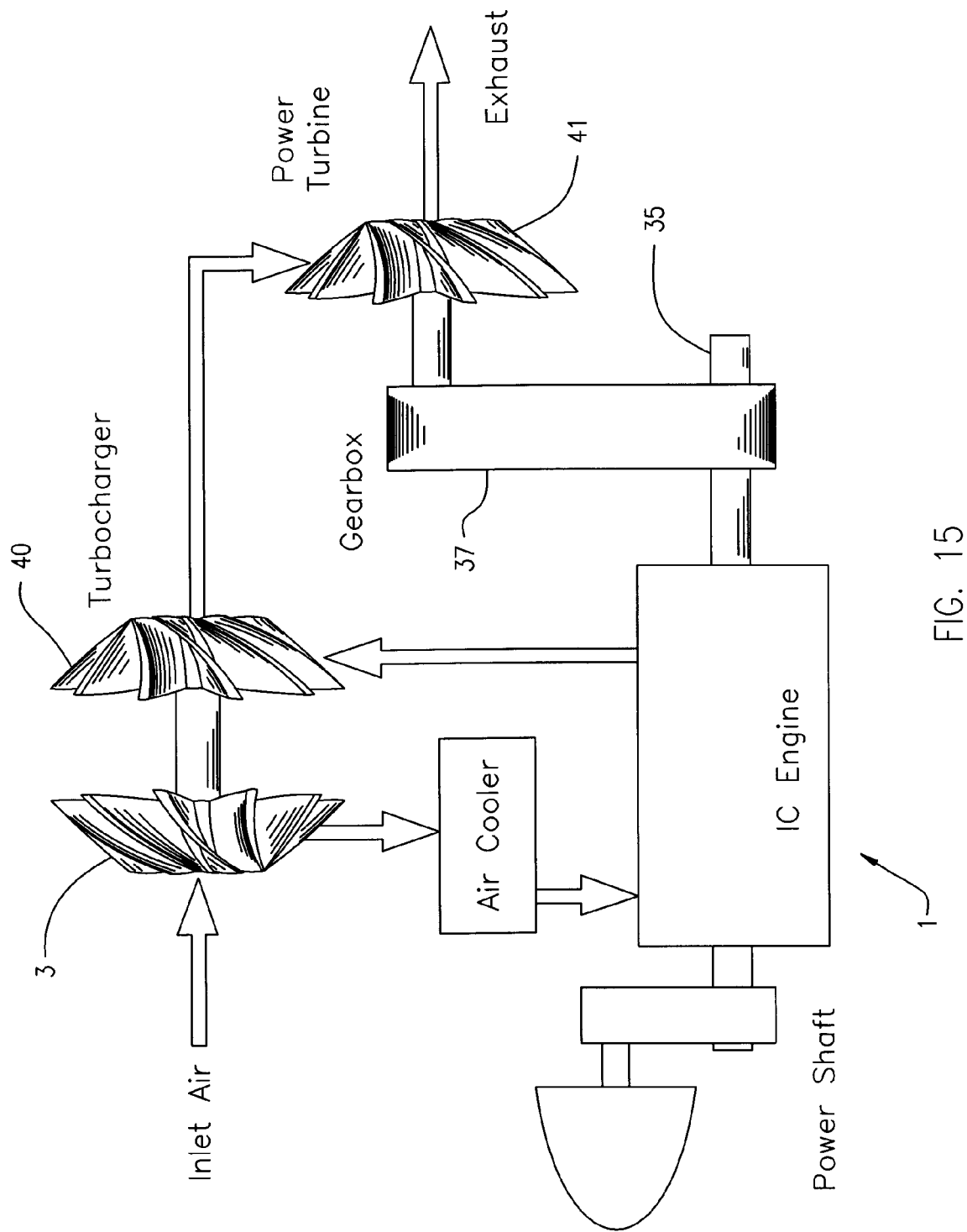
FIG. 15 shows a schematic representation of the engine components.

A radial engine as shown in FIGS. 13-15 has five cylinders 14 disposed equidistantly circumferentially around the crankshaft 35. Each cylinder progresses through the same cycle and fire in sequential order, such that the phases of the cycle are offset from the neighboring cylinder by 72° (degrees). Each cylinder cycle is illustrated by FIGS. 3-6 an FIGS. 22-28, and proceeds substantially as described herein above, with the following additional features.

Ambient air at ambient temperature and pressure is compressed by an inlet air supercharger 3, and discharged in a counter-clockwise circumferential direction (as viewed in FIG. 16) into the annular inlet air manifold 64 in a continuous circulating stream of pressurized inlet air. The surface area of the annular inlet air manifold provides some cooling of the circulating compressed inlet air, although after-cooling of the compressed air can be used, bringing the circulating, compressed inlet air within the manifold. A portion of the circulating, compressed inlet air is discharged through the air discharge port 67 and through the uncovered swirl ports 8 (or port 88 in FIG. 13) into the bottom of the cylinder chamber. During the exhaust phase, the expanding pressurized combustion gases (exhaust) passes out of the cylinder through port 22 and expands into the second annular exhaust manifold 71 in a clockwise direction (as viewed in FIG. 16). Distribution of the entry points of the cylinder exhaust gases into the annular exhaust manifold helps to dampen out exhaust gas pressure pulses. At the terminating end of the second annular exhaust manifold 71, the exhaust gases expand and discharge into the inflow radial turbine 40, which powers the inlet air supercharge 3. Preferably the annular exhaust manifold is thermally insulated to prevent temperature and energy loss through the manifold, to extract more energy in the inflow radial turbine and the power turbine.

EXAMPLES

An example of the engine using the improved cylinder of the present invention is a compound turboprop engine is a two-stroke, uniflow, four cylinder air cooled flat-four aircraft engine based on the Rotax 912 (http://www.rotax-service.com/rotax_engines/rotax_912ULsp.htm), with a high pressure ratio supercharger compressor that is powered by an exhaust driven turbine. The high pressure turbine is followed by a low pressure power turbine that is geared to the engine crankshaft. An example of a low pressure exhaust turbine is described in U.S. Pat. No. 7,240,491, the disclosure of which is incorporated by reference in its entirety. The engine cylinders have circumferential intake ports at the bottom of the piston stroke with swirl vanes. A large single exhaust valve is at the top of the cylinder. The fuel is injected directly into the swirling airflow near the top of the piston stroke. The fuel is ignited by a high energy sparkplug.

Advantageous features of an engine of the present invention include:

1) straight-through scavenge flow with high scavenge efficiency.

2) full circumferential cylinder intake ports with swirl vanes and low pressure losses.

3) stratified charge with high swirl for reduced combustion delay and high efficiency.

4) large sodium cooled exhaust valves with solenoid operation for starting.

5) high joule spark ignition for cold weather starting and for burning different fuels.

6) air cooled compact engine geometry for light weight and low cost.

7) inlet manifold plenum with intercooling and uniform flow to all cylinders.

8) insulated exhaust manifold designed to damp out blowdown pressure pulses.

9) short stroke, over-square cylinder geometry for low piston speeds at high revolutions.

10) thermal barrier coating (TBC) on piston crowns and inside of cylinder heads to reduce heat loss.

11) lean burning for high efficiency and reduced combustion heat loss an reduced emissions.

12) TBC coatings and lean burning also reduce HC, CO, and NOx emissions.

This engine can be scaled up or down over a large range to meet power requirements. The engine operating with the improved, inlet air swirling, TBC coatings, and lean burning means of the present invention has about half of the combustion heat loss of a conventional engine.

Some Important Advantages for the Turbocharged Compound IC Engine of the present invention include:

a) Small Size-Light Weight: The compact two-stroke, pressure lubricated engine configuration has a much smaller size and is much lighter in weight than a conventional 500 hp engine configuration. The size of a 500 HP engine is 2 ft. long and 2 ft. wide.

b) Inlet and Exhaust Systems: Provides uniform flow to all of the engine cylinders and uniform flow, and reduced flow pulsations to the turbine. Also, the inlet plenum is used as a compressor exit intercooler, with cooling fins around the outside.

c) Swirl Combustion in the Engine Cylinders: In contrast to a conventional loop scavenged two-stroke design, where uniform swirl flow cannot be achieved, the engine of the present invention has low pressure loss swirl vanes in inlet ports spaced about 360° around the air inlet of the cylinders. Swirl flow, which induces high intensity, small scale turbulence, is important for rapid mixing with a short combustion delay time, and to complete the combustion process as early as possible in the expansion stroke. Test data results have been published for swirling flow in a Diesel engine. One set of data is plotted on a pressure-crank angle diagram for four different swirl flow ratios. As the swirl rate is increased, the maximum cylinder pressure increases from 600 psi to 900 psi. The maximum pressure also occurs at a smaller crank angle with the higher swirl rate. The improvement in mean effective pressure (mep) and efficiency due to the increase in swirl is significant and substantial.

d) High Scavenge Efficiency: For the same combustion delay time, scavenge efficiency does not affect cycle efficiency, because energy input (fuel flow) is decreased as work output is decreased because of more un-scavenged combustion products. However, low scavenge efficiency and dilution of the unburned gases in the cylinder with burned products will increase the time required for the fuel to find the oxygen, which increases combustion delay time and the crank angle for maximum pressure which does decrease the cycle efficiency. The uniflow cylinder design of the present invention has a much higher scavenge efficiency (about 90%) than the loop scavenged design (about 70%), which is the percent of fresh air in the cylinder volume when the exhaust valve closes with some of the unscavenged burned gases remaining in the cylinder.

e) Solenoid Push Rods for Starting: Starting the high compression engine would be, accomplished by programming solenoids on the exhaust valve push rods to be fully open at starting conditions with no compression in the cylinders. When the engine reaches starting speed with a relatively small electric starter motor, the fuel injectors, and igniters would be timed to fire the cylinders as the solenoids close the exhaust valves, in the proper sequence.

f) Fuel Flexibility: By using a computer controlled high energy spark ignition system, rather than depending on compression ignition, a wide range of fuels could be used. Also the ignition timing could be controlled to improve cold weather starting and match all operating conditions, which would improve off-design efficiency.

g) Lean Burning: The two-stroke cycle, direct injection, turbo-compound engine would take advantage of the direct injection by burning lean at high power conditions, which would improve engine efficiency. Also, the lower combustion temperatures, combined with thermal barrier coatings (TBC) would greatly reduce heat losses to the cooling system, which would result in a large improvement in engine efficiency. The engine power would be controlled by the fuel flow, which would eliminate intake air throttling and result in low intake manifold pressure losses and higher efficiency at low power conditions. Very lean burning can be accomplished with high swirl, stratified charge fuel injection and high energy spark ignition.

COMPARATIVE EXAMPLES

The Table A below shows a calculated comparison of the horsepower output and Specific fuel consumption (SFC) for various internal combustion engines, using the same cycle analysis program.

TABLE A

| IC Engine: | Horsepower Output: | Calculated SFC: | Test SFC: |
|---|---|---|---|
| Typical Auto Engine | 200 | 0.567 | 0.55 |
| Typical Diesel Engine | 400 | 0.451 | 0.45 |
| Napier Nomad 1 Inline Compound Turboprop | 3,000 | 0.350 | 0.345 |
| HAECO-Baker Compound Turbo Diesel | 718 | 0.386 | 0.365 * |
| HAECO-Detroit Diesel Compound Turbo Diesel | 400 | 0.392 | No Results |
| Compound Engine Turboprop of the Invention | 500 | 0.286 | — |

* Baker Engineering cycle analysis.

Published and calculated specifications for a conventional Rotax 912 engine, and calculations for a modified Rotax 912 turbocompound engine with the uniflow internal combustion cylinder of the present invention, are presented below in Table B:

TABLE B

| | Rotax 912 | | Turbocompound |
|---|---|---|---|
| | (Published) | (Calculated) | (calculated) |
| Horsepower | 80 | 80.2 | 500 |
| Displacement - cu. in. | 74 | 75.9 | 61.6 |
| SFC - lb/hp-hr | 0.46 | 0.49 | 0.286 |

I claim:

1. A radial two-stroke, uniflow, internal combustion (IC) engine including a plurality of cylinders arranged radially around a common engine axis, each cylinder including: a cylinder wall and a cylinder head having an exhaust port, an exhaust valve disposed in the exhaust port, a fuel injector and a spark means disposed through the cylinder head, a piston mounted in the cylinder for reciprocal movement between a top dead center (TDC) position and a bottom dead center (BDC) position, and through a compression stroke and a power stroke, at least one swirl inlet port passing through the cylinder wall at the bottom of the cylinder, the at least one swirl inlet port oriented tangential to an axial centerline of the cylinder, wherein the at least one swirl port is covered and uncovered in response to the reciprocal movement of the piston; and further including a high pressure inlet air compressor that discharges to an inlet air manifold, an annular exhaust air manifold in exhaust gas communication with each exhaust port, and an exhaust-driven radial in-flow turbine that drives the air compressor.

2. The radial two-stroke, uniflow IC engine according to claim 1 wherein the inlet air manifold includes an annular inlet air manifold in inlet air communication with each of the at least one swirl inlet port in each of the plurality of cylinders.

3. The radial two-stroke, uniflow IC engine according to claim 1, further comprising an electronic control module to control the timing and quantity of fuel delivery, relative to the amount (mass) of inlet air within the cylinder chamber, to provide a lean burning fuel air mixture.

4. The IC engine according to claim 1 wherein the at least one swirl port directs inlet air into the cylinder in a tangential, turbulent, unidirectional flow, and the fuel injector is oriented in the cylinder head to inject fuel in a spray pattern downstream along a tangential pathway in the direction of the tangential, turbulent, unidirectional flow of the inlet air, with a fuel rich center in the spray pattern.

5. The IC engine according to claim 4 wherein the spark means is a spark igniter is positioned directly downstream of the fuel injector, along the pathway of the fuel rich center of the spray pattern.

6. The IC engine according to claim 5 wherein the cylinder head includes a thermal barrier coating on an inside of cylinder head to reduce heat loss.

7. The IC engine according to claim 6 wherein the thermal barrier coating is a ceramic matrix composite (CMC).

8. A method for operating a radial internal combustion (IC) engine that includes a multiple, radially-arranged reciprocating two-stroke uniflow cylinders, the IC engine including a high pressure supercharger inlet air system that includes a high pressure compressor, and each cylinder includes a cylinder wall and a cylinder head, the cylinder head having an exhaust port, a fuel injector and a spark means disposed through the cylinder head, a piston reciprocally mounted in the cylinder for movement alternately through compression and power strokes, and an air inlet including one or more swirl ports disposed through the cylinder wall and entering the cylinder chamber tangentially with respect to the axial centerline of the cylinder, and wherein the one or more swirl ports are opened and closed in response to movement of said piston, the method comprising repeating a cylinder cycle, the cycle comprising the steps of: a) compressing ambient air and passing the pressurized inlet air in a circumferential direction into an annular inlet air manifold, b) directing a portion of the pressurized inlet air out of the annular inlet air manifold, through an uncovered swirl port, and into the cylinder with the piston proximate the bottom of its reciprocal stroke within the cylinder, and swirling the inlet air in tangential, turbulent, unidirectional flow within the cylinder, c) maintaining the exhaust port in an open position while the inlet air ports are uncovered to provide scavenging of the cylinder by the inlet air, d) advancing the piston upward to cover the inlet ports, e) closing the exhaust port, f) compressing the inlet air between the piston and the cylinder head, g) dispersing a fuel near the end of the compression stroke at a lean burning fuel to air ratio of about 0.2 to about 0.8, relative to a stoicheometric fuel to air ratio of 1:1, the fuel being dispersed in the same tangential direction as the flow of the turbulent, swirling air, to obtain a stratified charge and intimate air-fuel mixing, h) spark igniting and combusting the stratified charge of the air-fuel mixture to initiate the power stroke, i) opening the exhaust port near the end of the power stroke to exhaust pressurized combustion gases, and j) uncovering the inlet ports as the piston approaches the bottom of its power stroke.

9. The method according to claim 8, wherein the cycle further comprises the steps of: passing the pressurized combustion gases as exhaust gases in a circumferential direction into an annular exhaust manifold, and passing the exhaust gases from the annular exhaust manifold into an inlet of a high pressure inflow turbine that drives the high pressure compressor.

10. The method according to claim 9, further comprising a step of driving a power turbine with the exhaust gases from the high pressure inflow turbine, and powering the crankshaft of the IC engine with the power turbine.

11. The method according to claim 8, wherein the fuel to air ratio is about 0.6.

12. The method according to claim 8 wherein the stratified charge of the fuel comprises dispersing the fuel in a spray pattern having a fuel rich center portion, and wherein the spark ignition of the stratified charge comprises ignites the fuel rich center portion of the spray pattern, despite an overall lean fuel to air ratio.

13. The method according to claim 12, further providing a step of including a thermal barrier coating on an inside of cylinder head to reduce heat loss through the cylinder head.

14. A method for operating a reciprocating two-stroke uniflow multiple cylinder internal combustion (IC) engine with a low pressure positive displacement inlet air compressor that provides an outlet:inlet pressure ratio of up to 4:1, the engine including a plurality of a cylinder that includes a cylinder wall and a cylinder head having an exhaust port, an exhaust valve disposed in the exhaust port, a fuel injector and a spark means disposed through the cylinder head, a piston mounted in the cylinder for reciprocal movement between a top dead center (TDC) position and a bottom dead center (BDC) position, and through a compression stroke and a power stroke, and at least one swirl inlet port passing through the cylinder wall at the bottom of the cylinder, and oriented tangential to an axial centerline of the cylinder, wherein the at least one swirl port is covered and uncovered in response to the reciprocal movement of the piston; the method comprising repeating a cylinder cycle, the cycle comprising the steps of: a) passing low pressure inlet air through the uncovered one or more swirl ports and into the cylinder with the piston proximate the bottom of its reciprocal stroke within the cylinder, and swirling the inlet air in tangential turbulent unidirectional flow within the cylinder wherein the mass quantity of inlet air is proportional to the engine revolution speed, b) maintaining the exhaust port in an open position while the inlet air ports are uncovered to provide scavenging of the cylinder by the inlet air, c) advancing the piston upward to cover the inlet ports, d) closing the exhaust port, e) compressing the inlet air between the piston and the cylinder head, preferably to a compression ratio of about 8:1 to about 12:1, f) dispersing a fuel near the end of the compression stroke at a lean burning fuel to air ratio in the range of about 0.2 to about 0.8, relative to a stoicheometric fuel to air ratio of 1:1, the fuel being dispersed in the same tangential direction as the flow of the turbulent, swirling air, to obtain a stratified charge and intimate air-fuel mixing, g) spark igniting and combusting the stratified charge of the air-fuel mixture to initiate the power stroke, h) opening the exhaust port near the end of the power stroke to exhaust pressurized combustion gases, and i) uncovering the inlet ports as the piston approaches the bottom of its power stroke.

15. The method according to claim 14, further comprising a step of driving a power turbine with low the pressurized combustion gases, and powering the crankshaft of the IC engine with the power turbine.

16. The method according to claim 14, wherein the fuel to air ratio is about 0.6.

17. The method according to claim 14 wherein the stratified charge of the fuel comprises dispersing the fuel in a spray pattern having a fuel rich center portion, and wherein the spark ignition of the stratified charge comprises ignites the fuel rich center portion of the spray pattern, despite an overall lean fuel to air ratio.

18. The method according to claim 17, further providing a step of including a thermal barrier coating on an inside of cylinder head to reduce heat loss through the cylinder head.

19. The method according to claim 14 wherein the exhausting of pressurized combustion gases comprising directing the pressurized combustion gases tangentially into an annular exhaust gas manifold.

\* \* \* \* \*